US006671611B1

(12) United States Patent
Peltier

(10) Patent No.: US 6,671,611 B1
(45) Date of Patent: Dec. 30, 2003

(54) METHOD AND APPARATUS FOR IDENTIFYING PARAMETERS OF AN ENGINE COMPONENT FOR ASSEMBLY AND PROGRAMMING

(75) Inventor: Daniel E. Peltier, Kenosha, WI (US)

(73) Assignee: Bombardier Motor Corporation of America, Grant, FL (US)

( * ) Notice: Subject to any disclaimer, the term of this patent is extended or adjusted under 35 U.S.C. 154(b) by 0 days.

(21) Appl. No.: 09/723,864

(22) Filed: Nov. 28, 2000

(51) Int. Cl.[7] .................................................. B60T 7/12

(52) U.S. Cl. ....................... 701/104; 123/478; 123/480; 701/101; 73/119 A

(58) Field of Search ................................ 123/478, 480; 73/119 A; 701/101, 104

(56) References Cited

U.S. PATENT DOCUMENTS 5,634,448 A * 6/1997 Shinogle et al. ............ 123/480
5,986,871 A * 11/1999 Forck et al. ................ 361/160
6,112,720 A 9/2000 Matta ......................... 123/446
6,360,161 B1 * 3/2002 Francis et al. .............. 701/115

FOREIGN PATENT DOCUMENTS

| | | | |
|---|---|---|---|
| WO | WO 97/20136 | 6/1997 | ........... F02D/41/24 |
| WO | WO 99/43940 | 9/1999 | ........... F02D/41/38 |
| WO | WO 00/20755 | 4/2000 | .......... F02M/65/00 |
| WO | WO 01/83972 A1 | 11/2001 | ........... F02D/41/24 |

* cited by examiner

*Primary Examiner*—Hieu T. Vo
*Assistant Examiner*—Johnny H. Hoang
(74) *Attorney, Agent, or Firm*—Ziolkowski Patent Solutions Group, LLC

(57) ABSTRACT

A bar code for a component, wherein the bar code has characteristics of the component encoded therein. The characteristics may have performance indicia for the component, which may be retrieved by a bar code scanner. Accordingly, the bar code may provide ready access to the characteristics for a variety of applications, such as an assembly process.

62 Claims, 10 Drawing Sheets

FIG. 6A
(PRIOR ART)
FIG. 6B
(PRIOR ART)
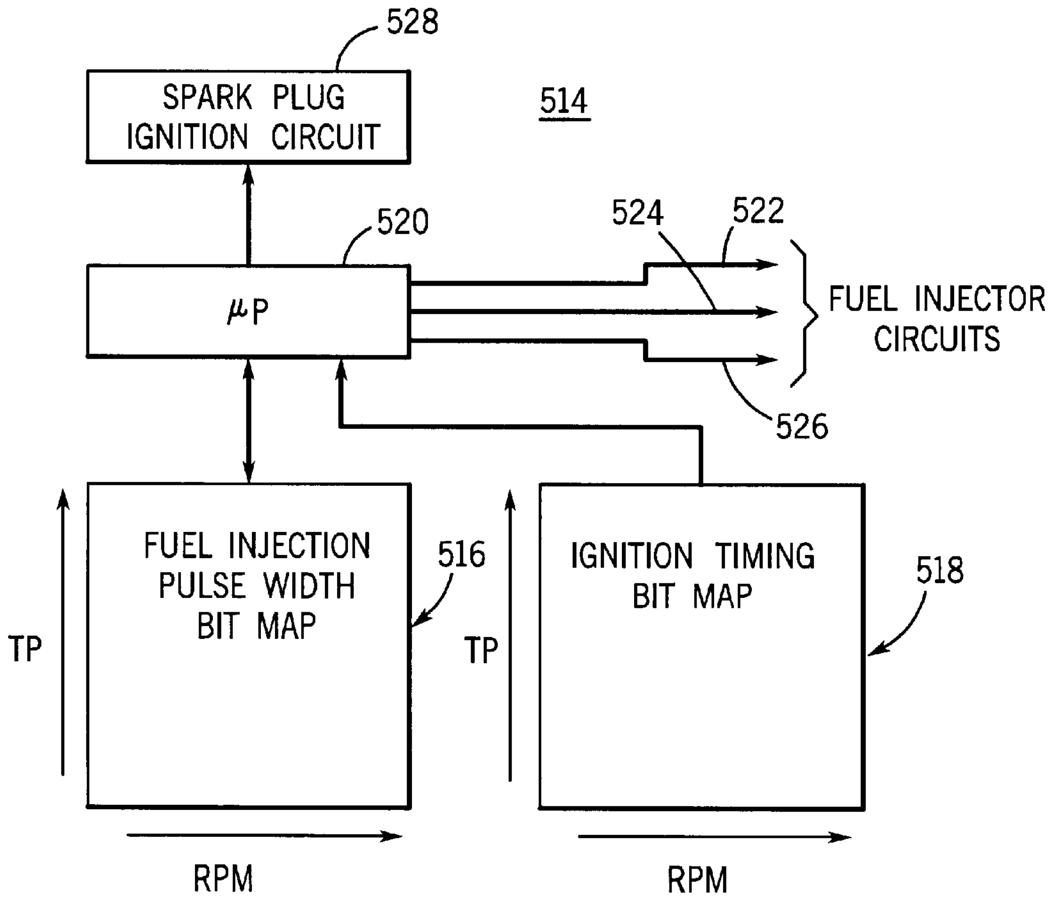
FIG. 7
(PRIOR ART)

METHOD AND APPARATUS FOR IDENTIFYING PARAMETERS OF AN ENGINE COMPONENT FOR ASSEMBLY AND PROGRAMMING

BACKGROUND OF THE INVENTION

1. Field of the Invention

The present technique relates generally to assembling a number of components, such as engine components. More specifically, the present technique relates to a system and method for identifying characteristics of an engine component, such as a fuel injector, and configuring a control system for an engine to account for performance characteristics of the component.

2. Description of the Related Art

In fuel injected engines, it is generally considered desirable that each injector deliver approximately the same quantity of fuel in approximately the same timed relationship to the engine for proper operation. It is well known that problems arise when the performance, and more particularly the timing and the quantity of fuel delivered by the injectors, diverge from target values beyond acceptable limits. For example, injector performance deviation or variability will cause different torques to be generated between cylinders due to unequal fuel amounts being injected, or from the relative timing of such fuel injection. Further, knowledge that such variations occur requires engine system designers to account for this variability by designing an engine system to provide an output equal to the maximum theoretical output less an amount due to the worse case fuel injector variability, rather than design a system for peak or maximum cylinder pressures or output.

Various attempts have been made for solving these problems associated with fuel injectors. One straightforward approach is simply to adhere to rigid manufacturing and test procedures to assure each injector meets a rigid desired design specification. This is a common approach for replacement fuel injectors. To simplify the service process, a set of service injector coefficient data may be reprogrammed in an Electronic Control Unit (ECU) memory and all service injectors manufactured under stringent tolerance requirements so as to function with the known service coefficients. In this manner, whenever a fuel injector fails, one of the special service fuel injectors is installed, and the ECU is simply instructed to use the service coefficient data for that particular cylinder. While this approach results in satisfactory operating conditions, it is relatively costly. That is, to manufacture each service injector with such stringent tolerances so that the flow rate satisfies a desired performance dictated by the fixed service injector coefficient data, results in a relatively expensive replacement fuel injector. Therefore, this approach is undesirable for both initial assembly and later servicing due to the increased manufacturing and assembly costs, and the low yield of acceptable units.

Sophisticated electronic equipment and control have made it possible to better control the problem of timing and delivery variations of similar fuel injectors. One such control involves compensating for individual injector variations and includes an electronic control module having a memory for storing compensation signals for each injector. The compensation signals are generally derived from a limited number of operating conditions, because fuel injectors may have relatively predictable, although different, performance characteristics. Therefore, the electronic control module can adjust the base fuel delivery signal for each injector as a function of the compensation data signal for that injector with relatively good results.

Unfortunately, some of the more complex and advanced fuel injectors now being manufactured do not follow readily predictable fuel-flow characteristics with increased pulse-width inputs, as was the case with earlier style injectors. Consequently, unless individual compensation signals are determined for an extremely large number of operating points resulting from different pulse widths, such systems would not operate satisfactorily with those advanced fuel injectors. Also, the amount of memory needed to store a sufficiently large number of compensation signals covering the full range of fuel injector operation would be excessively large, and the cost involved in the necessary testing to determine such a large number of compensation signals would be unacceptable.

Advanced fuel injectors are very complicated and difficult to manufacture. Therefore, it is very difficult to provide consistent operating characteristics between injectors, even though they are intended to be substantially identical. Furthermore, although varying the pulse width of a control signal may be used to vary the amount of fuel an injector provides to a cylinder (hereinafter referred to as fuel flow or flow rate), a performance curve of these complicated fuel injectors (fuel flow vs. pulse width) cannot be accurately defined by a second-order polynomial as can some older types of fuel injectors. Consequently, determining the pulse width for a desired RPM by extrapolating between sample data points does not provide satisfactory performance.

Accordingly, it would be desirable to provide a system and method for optimizing a combustion engine for a production fuel injector having normal or wide tolerances, thereby lowering costs and manufacturing difficulties. Specifically, it would be desirable to have performance characteristics for a particular fuel injector readily available and electronically transferable, such that the particular fuel injector could be readily assembled into a combustion engine for substantially optimal performance therein. Similarly, it would be desirable to have such performance characteristics readily available and electronically transferable for other components of a combustion engine system. Moreover, it would be desirable to provide such a technique that could be used with other engine components and systems, as well as with other types of machines and systems.

SUMMARY OF THE INVENTION

The invention features a technique for identifying component characteristics and assembling or configuring a number of components, using indicia associated with the component to store characteristics of a particular component being assembled with a particular device or system. The characteristics may include a variety of information regarding the particular component, but in an exemplary embodiment the information may include performance parameters or indicia based on component testing. These characteristics may then be retrieved, such as by a bar code scanner, which allows the characteristics to be readily available for use in a variety of applications. In an exemplary embodiment a bar code may provide easy access to the characteristics during an assembly and programming process.

Accordingly, the present technique may feature a system for assembling a device having a combustion chamber. The system may have a data set and a bar code or other indicia having the data set encoded therein. The data set may have performance indicia derived from testing an injector unit or other devices. In the case of an injector, the indicia may be particularized for the injector unit, and may be retrievable by a scanner, allowing access to the data set such that the injector unit may be readily assembled with the device according to the performance indicia.

In an alternative embodiment, the technique may feature a system for installing a component. The system may include a component, such as for a motor assembly, a set of component characteristics comprising parameters derived from tests on the performance of the component, and a bar code or similar machine-readable indicia for distribution with the component, wherein the set of component characteristics are encoded in the bar code or indicia.

In another alternative embodiment, the technique may feature a method of enhancing an assembly process. The method may involve testing a component configured for assembly in a system, such as a motor assembly, obtaining data on the performance of the component from the testing, determining a set of parameters characterizing the component based on the data, and encoding the set of parameters into indicia, such as a bar code, for distribution with the component and programming of the system.

In another alternative embodiment, the technique may feature a method for installing a component into a system having a motor. The method may involve scanning a bar code or other indicia associated with the component, decoding a set of parameters encoded in the indicia, the set of parameters comprising performance indicia characterizing the component, and configuring the system according to the set of parameters.

BRIEF DESCRIPTION OF THE DRAWINGS

The foregoing and other advantages of the invention will become apparent upon reading the following detailed description and upon reference to the drawings in which:

FIGS. 6(*a*) and (*b*) are graphs illustrating how the position of the fuel injection pulse and the pulse width as well as the ignition timing may be varied with respect to crankshaft position;

FIG. 7 is a block diagram of a prior art system for optimizing operational characteristics of an engine by adjusting the fuel injection pulse width to all cylinders for a given throttle position;

DETAILED DESCRIPTION OF SPECIFIC EMBODIMENTS

Figure 1:
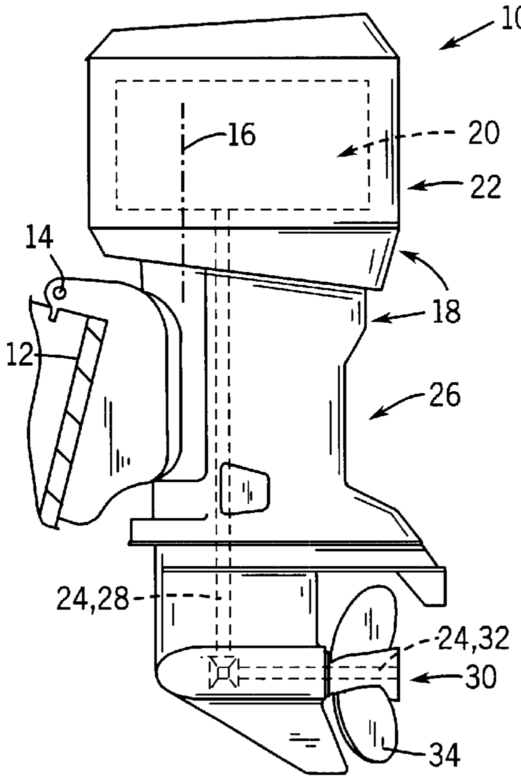
FIG. 1 is a side view of a marine propulsion device embodying an outboard drive or propulsion unit adapted for mounting to a transom of a watercraft.
Figure 2:
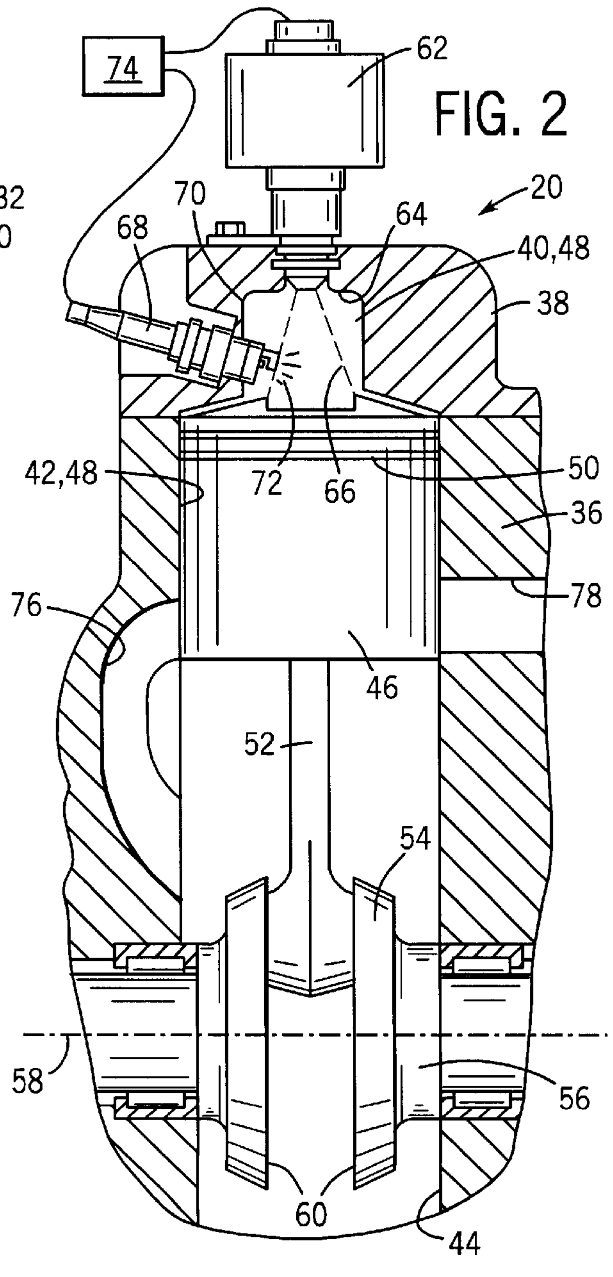
FIG. 2 is a cross-sectional view of the combustion engine.

The present technique will be described with respect to a 2-cycle outboard marine engine as illustrated in FIGS. 1–2. However, it will be appreciated that this invention is equally applicable for use with a 4-cycle engine, a diesel engine, or any other type of internal combustion engine having at least one component, such as a fuel injector, which can be characterized by a number of performance parameters. The present technique is also applicable in other areas, where components having performance characteristics are assembled, serviced, or replaced in an overall mechanical/electrical system.

FIG. 1 is a side view of a marine propulsion device embodying an outboard drive or propulsion unit 10 adapted to be mounted on a transom 12 of a watercraft for pivotal tilting movement about a generally horizontal tilt axis 14 and for pivotal steering movement about a generally upright steering axis 16. The drive or propulsion unit 10 has a housing 18, wherein a fuel-injected, two-stroke internal combustion engine 20 is disposed in an upper section 22 and a transmission assembly 24 is disposed in a lower section 26. The transmission assembly 24 has a drive shaft 28 drivingly coupled to the combustion engine 20, and extending longitudinally through the lower section 26 to a propulsion region 30 whereat the drive shaft 28 is drivingly coupled to a propeller shaft 32. Finally, the propeller shaft 32 is drivingly coupled to a prop 34 for rotating the prop 34, thereby creating a thrust force in a body of water. In the present technique, the combustion engine 20 may embody a four-cylinder or six-cylinder V-type engine for marine applications, or it may embody a variety of other combustion engines with a suitable design for a desired application, such as automotive, industrial, etc.

FIG. 2 is a cross-sectional view of the combustion engine 20. For illustration purposes, the combustion engine 20 is illustrated as a two-stroke, direct-injected, internal combustion engine having a single piston and cylinder. As illustrated, the combustion engine 20 has an engine block 36 and a head 38 coupled together and defining a firing chamber 40 in the head 38, a piston cylinder 42 in the engine block 36 adjacent to the firing chamber 40, and a crankcase chamber 44 in the engine block 36 adjacent to the piston cylinder 42. A piston 46 is slidably disposed in the piston cylinder 42, and defines a combustion chamber 48 adjacent to the firing chamber 40. A ring 50 is disposed about the piston 46 for providing a sealing force between the piston 46 and the piston cylinder 42. A connecting rod 52 is pivotally coupled to the piston 46 on a side opposite from the combustion chamber 48, and the connecting rod 52 is also pivotally coupled to an outer portion 54 of a crankshaft 56 for rotating the crankshaft 56 about an axis 58. The crankshaft 56 is rotatably coupled to the crankcase chamber 44, and preferably has counterweights 60 opposite from the outer portion 54 with respect to the axis 58.

In general, an internal combustion engine such as engine 20 operates by compressing and igniting a fuel-air mixture. In some combustion engines, fuel is injected into an air intake manifold, and then the fuel-air mixture is injected into the firing chamber for compression and ignition. As described below, the illustrated embodiment intakes only the air, followed by direct fuel injection and then ignition in the firing chamber.

A fuel injection system, having a fuel injector 62 disposed in a first portion 64 of the head 38, is provided for directly injecting a fuel spray 66 into the firing chamber 40. An ignition assembly, having a spark plug 68 disposed in a second portion 70 of the head 38, is provided for creating a spark 72 to ignite the fuel-air mixture compressed within the firing chamber 40. As discussed in further detail, the control and timing of the fuel injector 62 and the spark plug 68 are critical to the performance of the combustion engine 20. Accordingly, the fuel injection system and the ignition assembly are coupled to a control assembly 74.

In operation, the piston 46 linearly moves between a bottom dead center position (not illustrated) and a top dead center position (as illustrated in FIG. 2), thereby rotating the crankshaft 56 in the process. At bottom dead center, an intake passage 76 couples the combustion chamber 48 to the crankcase chamber 44, allowing air to flow from the crankcase chamber 44 below the piston 46 to the combustion chamber 48 above the piston 46. The piston 46 then moves linearly upward from bottom dead center to top dead center, thereby closing the intake passage 76 and compressing the air into the firing chamber 40. At some point, determined by the control assembly 74, the fuel injection system is engaged to trigger the fuel injector 62, and the ignition assembly is engaged to trigger the spark plug 68. Accordingly, the fuel-air mixture combusts and expands from the firing chamber 40 into the combustion chamber 48, and the piston 46 is forced downwardly toward bottom dead center. This downward motion is conveyed to the crankshaft 56 by the connecting rod 52 to produce a rotational motion of the crankshaft 56, which is then conveyed to the prop 34 by the transmission assembly 24 (as illustrated in FIG. 1). Near bottom dead center, the combusted fuel-air mixture is exhausted from the piston cylinder 42 through an exhaust passage 78. The combustion process then repeats itself as the piston is charged by air through the intake passage 76.

Figure 3:
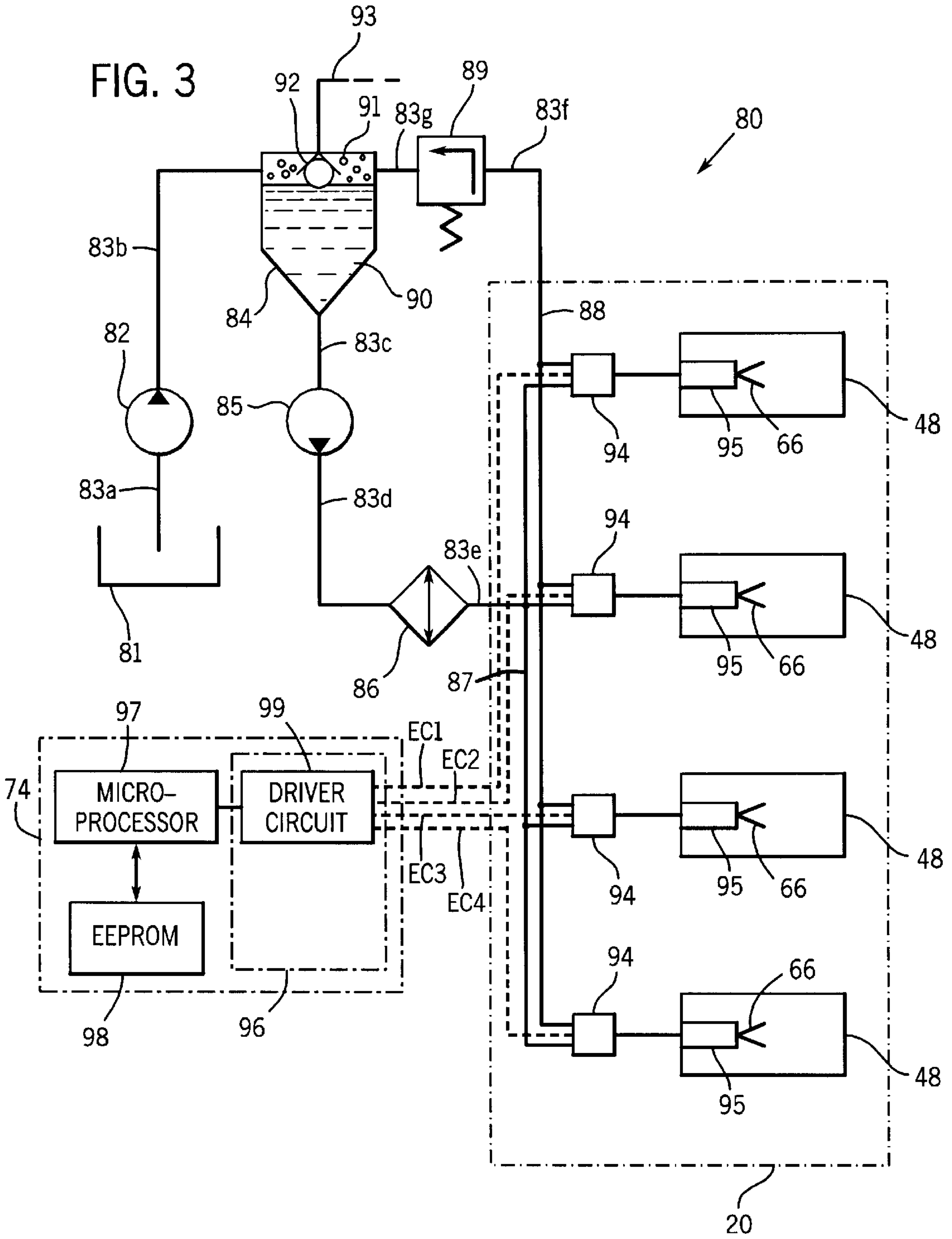
FIG. 3 is a diagrammatically representation of a series of fluid pump assemblies applied to inject fuel into an internal combustion engine.

Referring now to FIG. 3, the fuel injection system 80 is diagrammatically illustrated as having a series of pumps for displacing fuel under pressure in the internal combustion engine 20. While the fluid pumps of the present technique may be employed in a wide variety of settings, they are particularly well suited to fuel injection systems in which relatively small quantities of fuel are pressurized cyclically to inject the fuel into combustion chambers of an engine as a function of the engine demands. The pumps may be employed with individual combustion chambers as in the illustrated embodiment, or may be associated in various ways to pressurize quantities of fuel, as in a fuel rail, feed manifold, and so forth. Even more generally, the present pumping technique may be employed in settings other than fuel injection, such as for displacing fluids under pressure in response to electrical control signals used to energize coils of a drive assembly, as described below. Moreover, the system 80 and engine 20 may be used in any appropriate setting, and are particularly well suited to two-stroke applications such as marine propulsion, outboard motors, motorcycles, scooters, snowmobiles and other vehicles.

In the exemplary embodiment shown in FIG. 3, the fuel injection system 80 has a fuel reservoir 81, such as a tank for containing a reserve of liquid fuel. A first pump 82 draws the fuel from the reservoir 81 through a first fuel line **83*a*, and delivers the fuel through a second fuel line 83*b* to a separator 84. While the system may function adequately without a separator 84, in the illustrated embodiment, separator 84 serves to insure that the fuel injection system downstream receives liquid fuel, as opposed to mixed phase fuel. A second pump 85 draws the liquid fuel from separator 84 through a third fuel line 83*c* and delivers the fuel, through a fourth fuel line 83*d* and further through a cooler 86, to a feed or inlet manifold 87 through a fifth fuel line 83*e*. Cooler 86** may be any suitable type of fluid cooler, including both air and liquid heater exchangers, radiators, and the like.

Fuel from the feed manifold 87 is available for injection into combustion chambers of engine 20, as described more fully below. A return manifold 88 is provided for recirculating fluid not injected into the combustion chambers of the engine. In the illustrated embodiment a pressure regulating valve 89 is coupled to the return manifold 88 through a sixth fuel line **83*f* and is used for maintaining a desired pressure within the return manifold 88. Fluid returned via the pressure regulating valve 89 is recirculated into the separator 84 through a seventh fuel line 83*g* where the fuel collects in liquid phase as illustrated at reference numeral 90. Gaseous phase components of the fuel, designated by referenced numeral 91 in FIG. 3, may rise from the fuel surface and, depending upon the level of liquid fuel within the separator, may be allowed to escape via a float valve 92. The float valve 92 consists of a float that operates a ventilation valve coupled to a ventilation line 93. The ventilation line 93 is provided for permitting the escape of gaseous components, such as for repressurization, recirculation, and so forth. The float rides on the liquid fuel 90 in the separator 84 and regulates the ventilation valve based on the level of the liquid fuel 90 and the presence of vapor in the separator 84**.

As illustrated in FIG. 3, engine 20 may include a series of combustion chambers 48 for collectively driving the crankshaft 56 in rotation. As discussed with reference to FIG. 2, the combustion chambers 48 comprise the space adjacent to a series of pistons 46 disposed in piston cylinders 42. As will be appreciated by those skilled in the art, and depending upon the engine design, the pistons 46 (FIG. 2) are driven in a reciprocating fashion within each piston cylinder 42 in response to ignition, combustion and expansion of the fuel-air mixture within each combustion chamber 48. The stroke of the piston within the chamber will permit fresh air for subsequent combustion cycles to be admitted into the chamber, while scavenging combustion products from the chamber. While the present embodiment employs a straightforward two-stroke engine design, the pumps in accordance with the present technique may be adapted for a wide variety of applications and engine designs, including other than two-stroke engines and cycles.

In the illustrated embodiment, the fuel injection system 80 has a reciprocating pump 94 associated with each combustion chamber 48, each pump 94 drawing pressurized fuel from the feed manifold 87, and further pressurizing the fuel for injection into the respective combustion chamber 48. In this exemplary embodiment, the fuel injector 62 (FIG. 2) may have a nozzle 95 (FIG. 3) for atomizing the pressurized fuel downstream of each reciprocating pump 94. While the present technique is not intended to be limited to any particular injection system or injection scheme, in the illustrated embodiment, a pressure pulse created in the liquid fuel forces the fuel spray 66 to be formed at the mouth or outlet of the nozzle 95, for direct, in cylinder injection. The operation of reciprocating pumps 94 is controlled by an injection controller 96 of the control assembly 74. The injection controller 96, which will typically include a programmed microprocessor or other digital processing circuitry and memory for storing a routine employed in providing control signals to the pumps, applies energizing signals to the pumps to cause their reciprocation in any one of a wide variety of manners as described more fully below.

Figure 4:
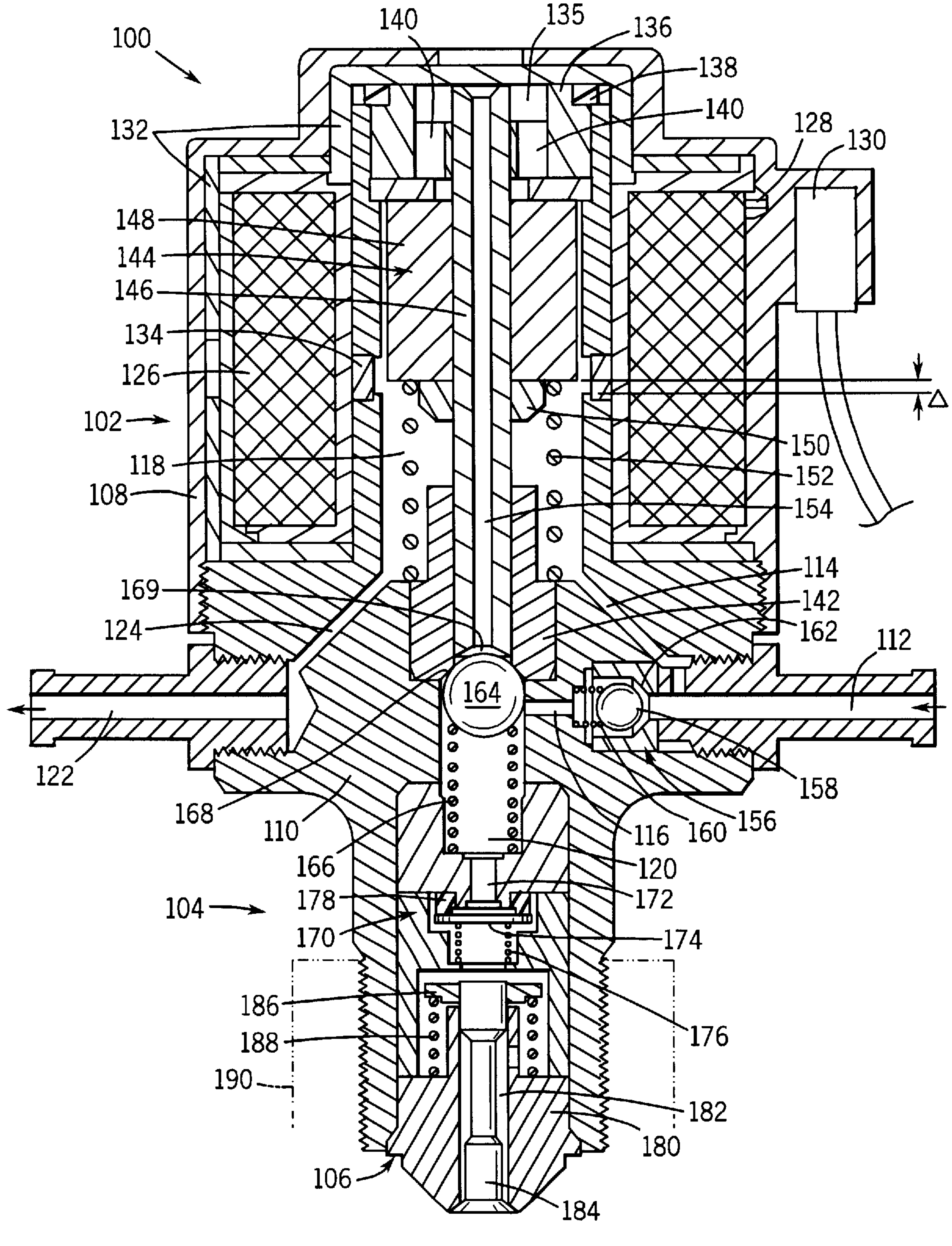
FIG. 4 is a partial sectional view of an exemplary pump in accordance with aspects of the present technique for use in displacing fluid under pressure, such as for fuel injection into a chamber of an internal combustion engine as shown in FIG. 3.
Figure 5:
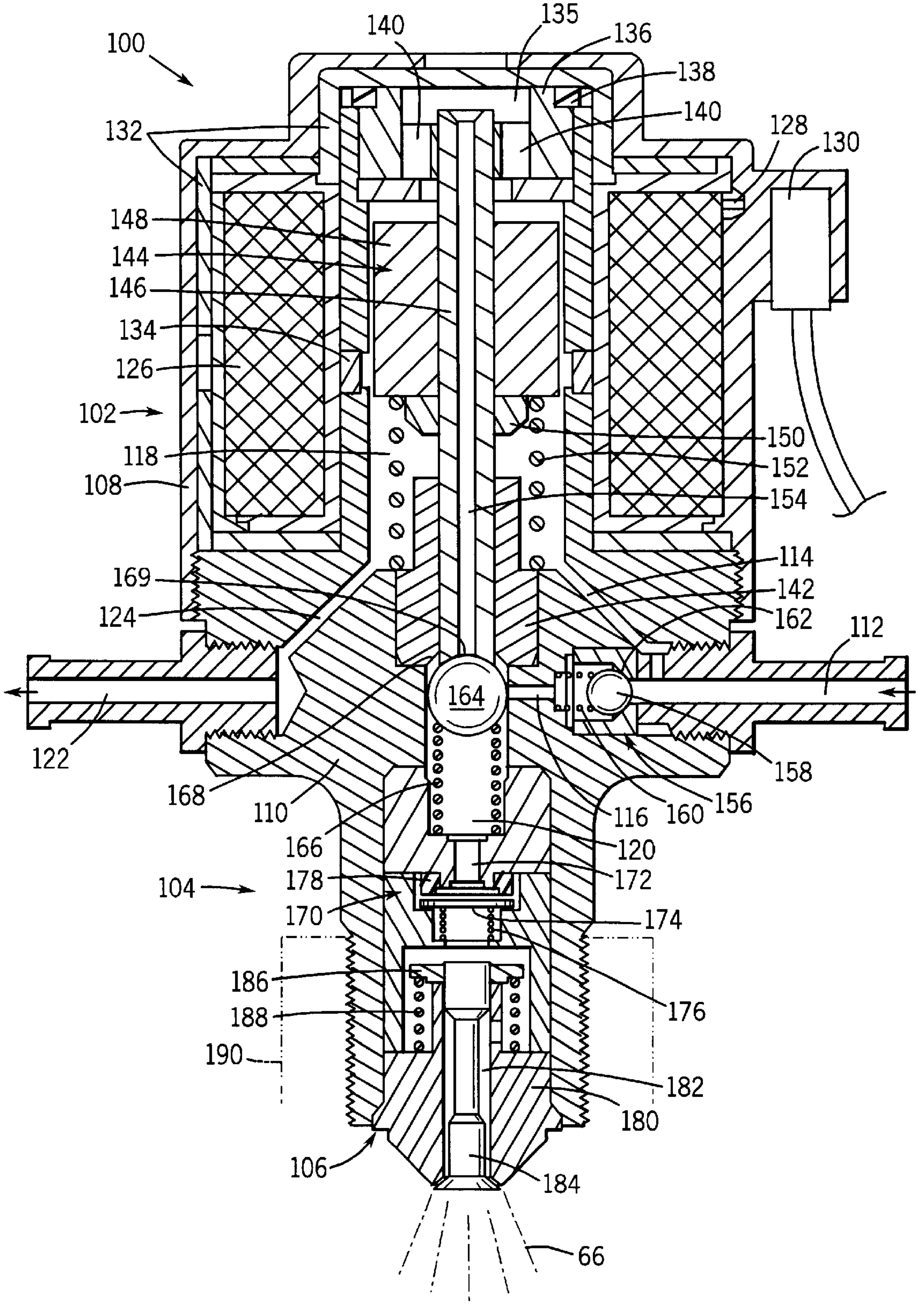
FIG. 5 is a partial sectional view of the pump illustrated in FIG. 4 energized during a pumping phase of operation.

Specifically, FIG. 4 illustrates the internal components of a pump assembly including a drive section and a pumping section in a first position wherein fuel is introduced into the pump for pressurization. FIG. 5 illustrates the same pump following energization of a solenoid coil to drive a reciprocating assembly and thus cause pressurization of the fuel and its expulsion from the pump. It should be borne in mind that the particular configurations illustrated in FIGS. 4 and 5 are intended to be exemplary only. Other variations on the pump may be envisaged; particularly variants on the components used to pressurize the fluid and to deliver the fluid to a downstream application.

In the presently contemplated embodiment, a pump and nozzle assembly 100, as illustrated in FIGS. 4 and 5, is particularly well suited for application in an internal combustion engine, as illustrated in FIGS. 1–3. Moreover, in the embodiment illustrated in FIGS. 4 and 5, a nozzle assembly is installed directly at an outlet of a pump section, such that the pump 94 and the nozzle 95.of FIG. 3 are incorporated into a single assembly 100. As indicated above, in appropriate applications, the pump 94 may be separated from the nozzle 95, such as for application of fluid under pressure to a manifold, fuel rail, or other downstream component. Thus, the fuel injector 62 described with reference to FIG. 2 may comprise the nozzle 95, the pump and nozzle assembly 100, or other designs and configurations capable of fuel injection.

Referring to FIG. 4, an embodiment is shown wherein the fluid actuators and fuel injectors are combined into a single unit, or pump-nozzle assembly 100. The pump-nozzle assembly 100 is composed of three primary subassemblies: a drive section 102, a pump section 104, and a nozzle 106. The drive section 102 is contained within a solenoid housing 108. A pump housing 110 serves as the base for the pump-nozzle assembly 100. The pump housing 110 is attached to the solenoid housing 108 at one end and to the nozzle 106 at an opposite end.

There are several flow paths for fuel within pump-nozzle assembly 100. Initially, fuel enters the pump-nozzle assembly 100 through the fuel inlet 112. Fuel can flow from the fuel inlet 112 through two flow passages, a first passageway 114 and a second passageway 116. A portion of fuel flows through the first passageway 114 into an armature chamber 118. For pumping, fuel also flows through the second passageway 116 to a pump chamber 120. Heat and vapor bubbles are carried from the armature chamber 118 by fuel flowing to an outlet 122 through a third fluid passageway 124. Fuel then flows from the outlet 122 to the common return line 26 (see FIG. 3).

The drive section 102 incorporates a linear electric motor. In the illustrated embodiment, the linear electric motor is a reluctance gap device. In the present context, reluctance is the opposition of a magnetic circuit to the establishment or flow of a magnetic flux. A magnetic field and circuit are produced in the motor by electric current flowing through a coil 126. The coil 126 is electrically coupled by leads 128 to a receptacle 130, which is coupled by conductors (not shown) to an injection controller 96 of the control assembly 74. Magnetic flux flows in a magnetic circuit 132 around the exterior of the coil 126 when the coil is energized. The magnetic circuit 132 is composed of a material with a low reluctance, typically a magnetic material, such as ferromagnetic alloy, or other magnetically conductive materials. A gap in the magnetic circuit 132 is formed by a reluctance gap spacer 134 composed of a material with a relatively higher reluctance than the magnetic circuit 132, such as synthetic plastic.

The control assembly 74 and/or the injection controller 96 may have a processor 97 or other digital processing circuitry, a memory device 98 such as EEPROM for storing a routine employed in providing command signals from the processor 97, and a driver circuit 99 for processing commands or signals from the processor 97. The control assembly 74 and the injection controller 96 may utilize the same processor 97 and memory as illustrated in FIG. 3, or the injection controller 96 may have a separate processor and memory device. The driver circuit 99 may be constructed with multiple circuits or channels, each individual channel corresponding with a reciprocating pump 94. In operation, a command signal may be passed from the processor 97 to the driver circuit 99, which responds by generating separate drive signals for each channel. These signals are carried to each individual pump 94 as represented by individual electric connections EC1, EC2, EC3 and EC4. Each of these connections corresponds with a channel of the driver circuit 99. The operation and logic of the control assembly 74 and injection controller 96 will be discussed in greater detail below.

A reciprocating assembly 144 forms the linear moving elements of the reluctance motor. The reciprocating assembly 144 includes a guide tube 146, an armature 148, a centering element 150 and a spring 152. The guide tube 146 is supported at the upper end of travel by the upper bushing 136 and at the lower end of travel by the lower bushing 142. An armature 148 is attached to the guide tube 146. The armature 148 sits atop a biasing spring 152 that opposes the downward motion of the armature 148 and guide tube 146, and maintains the guide tube and armature in an upwardly biased or retracted position. Centering element 150 keeps the spring 152 and armature 148 in proper centered alignment. The guide tube 146 has a central passageway 154 which permits the flow of a small volume of fuel when the surge tube 146 moves a given distance through the armature chamber 118 as described below. Flow of fuel through the guide tube 146 permits its acceleration in response to energization of the coil during operation.

When the coil 126 is energized, the magnetic flux field produced by the coil 126 seeks the path of least reluctance. The armature 148 and the magnetic circuit 132 are composed of a material of relatively low reluctance. The magnetic flux lines will thus extend around coil 126 and through magnetic circuit 132 until the magnetic gap spacer 134 is reached. The magnetic flux lines will then extend to armature 148 and an electromagnetic force will be produced to drive the armature 148 downward towardsalignment with the reluctance gap spacer 134. When the flow of electric current is removed from the coil by the injection controller 96, the magnetic flux will collapse and the force of spring 152 will drive the armature 148 upwardly and away from alignment with the reluctance gap spacer 134. Cycling the electrical control signals provided to the coil 126 produces a reciprocating linear motion of the armature 148 and guide tube 146 by the upward force of the spring 152 and the downward force produced by the magnetic flux field on the armature 148.

During the return motion of the reciprocating assembly 144 a fluid brake within the pump-nozzle assembly 100 acts to slow the upward motion of the moving portions of the drive section 102. The upper portion of the solenoid housing 108 is shaped to form a recessed cavity 135. An upper bushing 136 separates the recessed cavity 135 from the armature chamber 118 and provides support for the moving elements of the drive section at the upper end of travel. A seal 138 is located between the upper bushing 136 and the solenoid housing 108 to ensure that the only flow of fuel from the armature chamber 118 to and from the recessed cavity 135 is through fluid passages 140 in the upper bushing 136. In operation, the moving portions of the drive section 102 will displace fuel from the armature chamber 118 into the recessedcavity 135 during the period of upward motion. The flow of fuel is restricted through the fluid passageways 140, thus, acting as a brake on upward motion. A lower bushing 142 is included to provide support for the moving elements of the drive section at the lower travel limit and to seal the pump section from the drive section.

While the first fuel flow path 114 provides proper dampening for the reciprocating assembly as well as providing heat transfer benefits, the second fuel flow path 116 provides the fuel for pumping and, ultimately, for combustion. The drive section 102 provides the motive force to drive the pump section 104 which produces a surge of pressure that forces fuel through the nozzle 106. As described above, the drive section 102 operates cyclically to produce a reciprocating linear motion in the guide tube 146. During a charging phase of the cycle, fuel is drawn into the pump section 104. Subsequently, during a discharging phase of the cycle, the pump section 104 pressurizes the fuel and discharges the fuel through the nozzle 106, such as directly into a combustion chamber 38 (see FIG. 3).

During the charging phase fuel enters the pump section 104 from the inlet 112 through an inlet check valve assembly 156. The inlet check valve assembly 156 contains a ball 158 biased by a spring 160 toward a seat 162. During the charging phase the pressure of the fuel in the fuel inlet 112 will overcome the spring force and unseat the ball 158. Fuel will flow around the ball 158 and through the second passageway 116 into the pump chamber 120. During the discharging phase the pressurized fuel in the pump chamber 120 will assist the spring 160 in seating the ball 158, preventing any reverse flow through the inlet check valve assembly 156.

A pressure surge is produced in the pump section 104 when the guide tube 146 drives a pump sealing member 164 into the pump chamber 120. The pump sealing member 164 is held in a biased position by a spring 166 against a stop 168. The force of the spring 166 opposes the motion of the pump sealing member 164 into the pump chamber 120. When the coil 126 is energized to drive the armature 148 towards alignment with the reluctance gap spacer 134, the guide tube 146 is driven towards the pump sealing member 164. There is, initially, a gap 169 between the guide tube 146 and the pump sealing member 164. Until the guidetube 146 transits the gap 169 there is essentially no increase in the fuel pressure within the pump chamber 120, and the guide tube and armature are free to gain momentum by flow of fuel through passageway 154. The acceleration of the guide tube 146 as it transits the gap 169 produces the rapid initial surge in fuel pressure once the guide tube 146 contacts the pump sealing member 164, which seals passageway 154 to pressurize the volume of fuel within the pump chamber 120.

Referring generally to FIG. 5, a seal is formed between the guide tube 146 and the pump sealing member 164 when the guide tube 146 contacts the pump sealing member 164. This seal closes the opening to the central passageway 154 from the pump chamber 120. The electromagnetic force driving the armature 148 and guide tube 146 overcomes the force of springs 152 and 166, and drives the pump sealing member 164 into the pump chamber 120. This extension of the guide tube into the pump chamber 120 causes an increase in fuel pressure in the pump chamber 120 that, in turn, causes the inlet check valve assembly 156 to seat, thus stopping the flow of fuel into the pump chamber 120 and ending the charging phase. The volume of the pump chamber 120 will decrease as the guide tube 146 is driven into the pump chamber 120, further increasing pressure within the pump chamber 120 and forcing displacement of the fuel from the pump chamber 120 to the nozzle 106 through an outlet check valve assembly 170. The fuel displacement will continue as the guide tube 146 is progressively driven into the pump chamber 120.

Pressurized fuel flows from the pump chamber 120 through a passageway 172 to the outlet check valve assembly 170. The outlet check valve assembly 170 includes a valve disc 174, a spring 176 and a seat 178. The spring 176 provides a force to seat the valve disc 174 against the seat 178. Fuel flows through the outlet check valve assembly 170 when the force on the pump chamber side of the valve disc 174 produced by the rise in pressure within the pump chamber 120 is greater than the force placed on the outlet side of the valve disc 174 by the spring 176 and any residual pressure within the nozzle 106.

Once the pressure in the pump chamber 120 has risen sufficiently to open the outlet check valve assembly 170, fuel will flow from the pump chamber 120 to the nozzle 106. The nozzle 106 is comprised of a nozzle housing 180, a passage 182, a poppet 184, a retainer 186, and a spring 188. The poppet 184 is disposed within the passage 182. The retainer 186 is attached to the poppet 184, and spring 188 applies an upward force on the retainer 186 that acts to hold the poppet 184 seated against the nozzle housing 180. A volume of fuel is retained within the nozzle 106 when the poppet 184 is seated. The pressurized fuel flowing into the nozzle 106 from the outlet check valve assembly 170 pressurizes this retained volume of fuel. The increase in fuel pressure applies a force that unseats the poppet 184. Fuel flows through the opening created between the nozzle housing 180 and the poppet 184 when the poppet 184 is unseated. The inverted cone shape of the poppet 184 atomizes the fuel flowing from the nozzle 106 in the form of a spray (e.g., fuel spray 66). The pump-nozzle assembly 100 is preferably threaded to allow the pump-nozzle assembly to be screwed into a cylinder head 190. Thus, the fuel spray from the nozzle 106 may be injected directly into a cylinder.

When the drive signal or current applied to the coil 126 is removed, the drive section 102 will no longer drive the armature 148 towards alignment with the reluctance gap spacer 134, ending the discharging phase and beginning a subsequent charging phase. The spring 152 will reverse the direction of motion of the armature 148 and guide tube 146 away from the reluctance gap spacer 134. Retraction of the guide tube from the pump chamber 120 causes a drop in the pressure within the pump chamber, allowing the outlet check valve assembly 170 to seat. The poppet 184 similarly retracts and seats, and the spray of fuel into the cylinder is interrupted. Following additional retraction of the guide tube, the inlet check valve assembly 156 will unseat and fuel will flow into the pump chamber 120 from the inlet 112. Thus, the operating cycle the pump-nozzle assembly 100 returns to the condition shown in FIG. 4.

Stepping back to the overall performance of combustion engines, such as engine 20, it is important to understand that each component may substantially affect the overall performance of the engine 20. Each component may have performance characteristics, dimensions, manufacturing tolerances, and other characteristics that are not equivalent to the desired or theoretical ones, resulting in variations from component to component. For example, two fuel injectors may be manufactured with the same desired dimensions and such, but the manufacturing process may result in slightly different dimensions and performance due to manufacturing tolerances. Other components, such as the engine block, pistons, intake and exhaust manifolds, and the head assembly, also may have variations for these reasons. These variations, when combined in an assembled product such as the combustion engine 20, may result in less than optimal performance. To illustrate the present technique in light of the foregoing problems, the following discussion will focus on optimizing a combustion engine for a particular fuel injector. Accordingly, a method and system will be presented for readily configuring the engine 20 for a particular fuel injector such as the fuel injector 62 (FIG. 2) or the pump and nozzle assembly 100. (FIGS. 4 and 5).

It is well known in the art that engine performance characteristics, such as torque, engine speed, engine emissions, and engine temperature, can be optimized by adjusting the amount of the fuel applied to all cylinders and the time at which that fuel is ignited. The amount of fuel injected into an engine cylinder is typically controlled by the width of the control pulse applied to the fuel injector to hold it open for a predetermined period of time and then closing it, thus allowing only a particular quantity of fuel to be injected into the cylinder. Thus, as can be seen in FIG. 6(*a*), curve 510 represents the pulse applied to a fuel injector to cause a certain amount of fuel to be injected into the cylinder. In a like manner, pulses 512 indicate that the ignition pulses that are supplied to the spark plug to ignite the fuel some predetermined period of time after injection of the fuel into the cylinders.

It is also well known that as the RPM of the engine increases, the fuel must be injected into the cylinders at a much earlier crankshaft position for most efficient operation of the engine. Thus, as shown in FIG. 6(b), pulse 510 has moved a greater distance away from the ignition pulses 512 at high engine RPM's. It was also known that by adjusting the pulse-width 510 to a width 510' or 510" as shown in FIG. 6(*b*), while monitoring the desired engine characteristics such as torque, RPM, emissions, and temperature, that the operation of the engine could be optimized. In a similar manner, it was discovered that if the ignition timing pulses 512 were varied between a range 512' or 512", while observing the desired engine operating characteristics such as torque, engine speed, emissions, and temperature, that the optimum operating conditions of the engine could be further improved.

FIG. 7 is a block diagram of a previous system 514 for optimizing engine operating characteristics, which may have a control assembly or other hardware such as in the control assembly 74 illustrated in FIG. 3. The system 514 has a first two-dimensional data storage cell array 516 representing throttle position versus engine RPM setting. Cell array 516 stores a gross pulse-width data value in each cell representing the same amount of fuel to be charged into all of the engine cylinders for each given throttle position and RPM setting to optimize operation of the engine as a whole. Thus, by running the engine at 1000 RPM and adjusting the fuel injection pulse-width, the torque of the engine can be maximized, the engine speed can be maximized, the emissions can be minimized, and the operating temperature can be minimized. For a selected RPM and throttle position, an optimum fuel injection pulse-width is determined and stored that optimizes the desired engine operating characteristics. This process is then repeated for a number of throttle positions and RPM settings until an entire bit map is created to store the gross pulse-width data value in each cell to optimize operation of the engine as a whole with respect to fuel injection. A control assembly could then, at any given throttle position and RPM setting, select from the storage array the correct pulse-width to determine the fuel injection that would optimize engine operations with respect to fuel injection. The control assembly may embody the hardware of the control assembly 74 (see FIG. 3), or may have a microprocessor 520 and other suitable components. Furthermore, the microprocessor 520 may be the processor 97, or it may be an additional or different processor for the control assembly 74.

In a like manner, a second two-dimensional data storage cell array 518 is created that also represents -throttle position versus engine RPM setting for storing a gross ignition timing signal in each cell representing the time at which ignition should occur in all of the cylinders for each given throttle position and RPM setting to further optimize operation of the engine as a whole with respect to ignition timing. The microprocessor 520 is connected to both of the first and second two-dimensional data storage cell arrays 516 and 518 and monitors engine RPM and throttle setting in a well-known manner. At each given RPM and throttle setting, the microprocessor 520 checks the stored data in the two-dimensional data storage cell arrays 516 and 518 and causes signals on lines 522, 524, and 526 to the various fuel injection circuits to cause the same amount of fuel to be charged into each cylinder based on the fuel injection pulse-width data stored in the bit map 516. It also caused the proper ignition of all the spark plugs 528 at the same relative time based on the data stored in the ignition timing bit map 518 for any given RPM and throttle position.

Although the system illustrated in FIG. 7 improved the operation of the engines based on engine operating characteristics, such as torque, engine speed, emissions, and temperature, this method simply is not satisfactory for present day requirements and is especially not satisfactory for use with engines having advanced complex fuel injectors, which are not accurately characterized by simple second-order polynomials as used with previous injectors. Accordingly, it would be desirable to characterize advanced fuel injectors by performance parameters or characteristic equations other than second-order polynomials. For example, the characteristic equation may comprise a third-order polynomial, exponential, logarithmic, or other mathematical functions necessary to characterize the performance of the advanced fuel injector.

Figure 8:
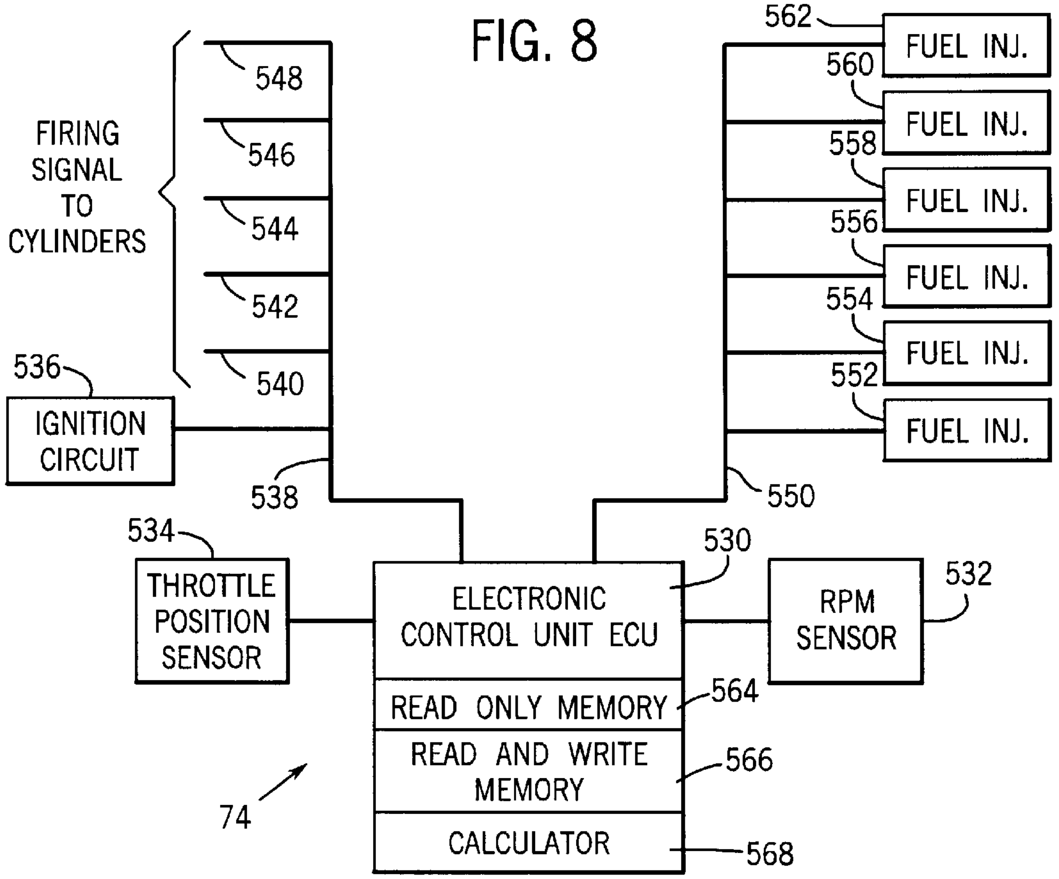
FIG. 8 is a block diagram of the present invention illustrating circuitry for determining the appropriate pulse width for providing a selected amount of fuel to achieve a desired RPM of the engine.

Referring now to FIG. 8 a block diagram of an exemplary control assembly 74 for the internal combustion engine 20 is illustrated, wherein the control assembly 74 has a central ECU (electronic control unit) 530 that receives inputs such as engine speed from RPM sensor 532 and throttle position from sensor 534. It will also be appreciated, that one of the primary purposes of an ECU in an automobile is to control the ignition firing and timing as indicated by the;ignition circuit shown as block 536 and receiving a signal from ECU 530 on line 538. As shown, the control signal from ECU 530 will also control additional cylinders such as indicated by lines 540, 542, 544, 546 and 548. It is not unusual for modern internal combustion engines of all types, whether diesel or gasoline fueled, to use fuel injectors (such as described in detail above) on each cylinder to provide fuel to the cylinder for combustion. Thus, as shown, ECU 530 further provides a control signal by means of line 550 to the fuel injectors indicated at 552, 554, 556, 558, 560, and 562. Thus, each cylinder of an internal combustion engine receives both an ignition firing signal and a fuel injection signal from the ECU.

In addition to those functions provided by an engine ECU in the past, the ECU used in an engine assembled for the present technique may also have a memory which may be a read-only memory 564 for storing a characteristic equation and a read/write memory 566 having storage locations associated with each cylinder of the engine for storing the coefficient data specifically associated with each fuel injector to provide fuel to that particular cylinder. For example, the characteristic equation may comprise a third order equation such as ax3+bx2+cx+d=0, as discussed above. The coefficient data is used in the aforementioned third-order equations stored in read-only memory 564. Other performance parameters for the particular fuel injector may also be stored in this manner. Accordingly, depending upon the throttle setting and the corresponding RPM, the equation in read-only memory 564 is provided to microprocessor or calculator 568 of ECU 530 along with the appropriate coefficient data of the characteristic equation associated with the cylinder for which the volume of fuel is being determined. Microprocessor 568 then uses the equation and the corresponding coefficient data to calculate the necessary pulse width and provide the requisite amount of fuel to the appropriate fuel injector 552–562 to achieve efficient engine operation.

Figure 9:
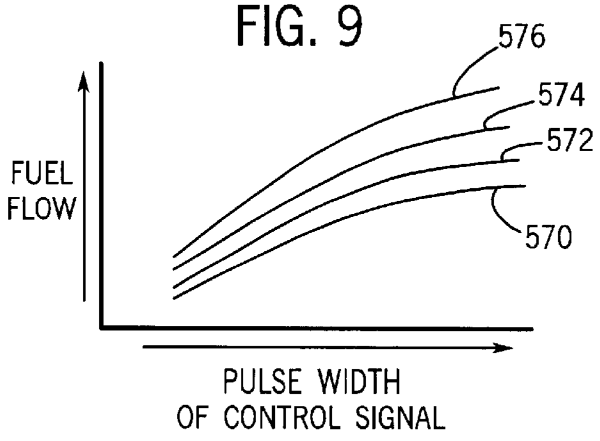
FIG. 9 shows a family of performance curves for fuel injectors, wherein the curves follow a second-order polynomial.

To aid in understanding the operation of the present invention and the requirement of using calculations with more advanced fuel injectors to determine pulse width, over those fuel injectors used in the past, reference is made to the set of curves illustrative of fuel injector performance of earlier less complex fuel injectors. As shown in FIG. 9, an increase in pulse width results in an increase in fuel flow in a rather predictable manner as shown by the second-order polynomial curves 570, 572, 574, and 576 representing four individual fuel injectors, as used in a four-cylinder engine. It is clear from each of these curves that if the fuel flow associated with a particular pulse width is known at several different, but known, pulse widths, because of the simple nature and the predictability, the fuel flow at any other pulse width which is not at a known point can be predicted or easily extrapolated with a fair amount of accuracy. Thus, in the previous fuel injector control calculations it was only necessary to store a few data points which associated fuel flow with pulse width for each fuel injector and then quickly extrapolate for pulse widths for which points were not available.

Figure 10:
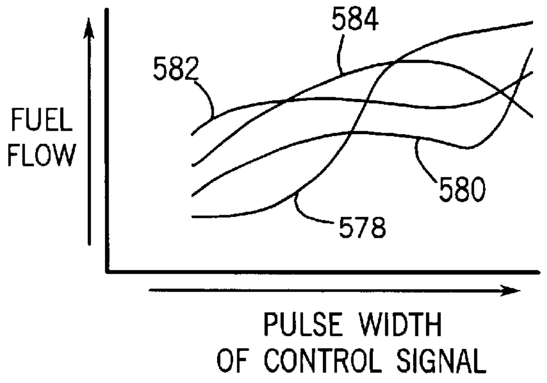
FIG. 10 shows a family of performance curves of complex fuel injectors, wherein the curves follow a third-order polynomial.

However, the advanced complex fuel injectors which are the subject of the present technique do not have such predictable pulse width versus fuel flow performance curves. For example, referring to FIG. 10, there is shown a set of four fuel injector performance curves 578, 580, 582, and 584 which clearly cannot be described by a second-order polynomial. To better describe the performance of these advanced complex fuel injectors, a more suitable, or possibly more complex, characteristic equation may be necessary to better fit the foregoing curves. For example, the characteristic equation may have a third-order polynomial. Because of the unpredictability and complexity of these performance curves, it will be appreciated that one cannot simply extrapolate between two desired fuel flow levels and determine the necessary pulse width with any degree of accuracy.

Consequently, the basic form of the characteristic equation, which may be a third-order polynomial, is stored in read-only memory 564 of ECU 530 and then for each cylinder the unique and specific coefficients which define a performance curve associated with each specific fuel injector are calculated. Then, as discussed above, by using this characteristic equation, the necessary pulse width for a desired fuel flow can be determined.

Figure 11:
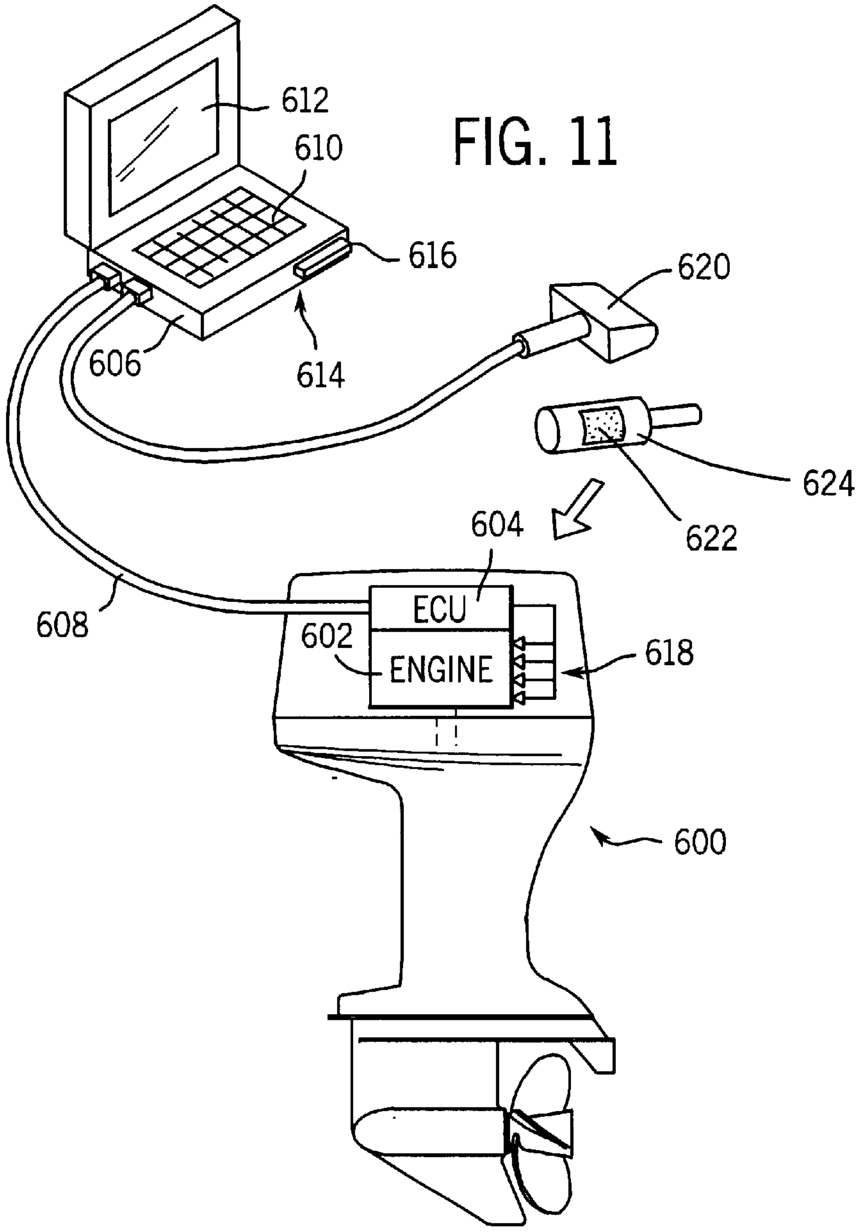
FIG. 11 is a perspective view of a fuel injected outboard marine engine having an ECU in communication with a portable processing unit, incorporating the present technique.

Referring now to FIG. 11, a perspective view of an outboard marine engine 600 having a fuel injected internal combustion engine 602, controlled by an ECU 604 is shown connected to a service computer 606. Advantageously, the ECU 604 may be part of a control assembly, such as the control assembly 74, and the ECU 604 may be the ECU 530 described above with reference to FIG. 8. In an exemplary embodiment, the service computer 606 is connected to the ECU 604 with a serial cable 608. However, it is contemplated that the service computer 606 can communicate with the ECU 604 in any number of ways, including but not limited to a SCSI (Small Computer System Interface) cable and card, a USB (Universal Serial Bus) cable and port, standard parallel connection, or with wireless technology, such as by infrared transmissions. The service computer 606 may be a transportable laptop, a desktop computer, specialized service computer, or any other processing unit capable of executing and running a computer program. In the illustrated embodiment, the service computer 606 has a keyboard 610, a monitor 612, and a disk drive 614. The drive 614 can receive an external disk or CD, or any other computer readable storage medium 616. Accordingly, data may be electronically transferred from the service computer 606 to the ECU 604, and then to any one of a number of fuel injectors 618 which are coupled to the ECU 604. In this manner, the performance of the engine may be controlled, as previously described.

A scanner 620 also may be coupled to the service computer 606 for electronically transferring scanned data to the computer, and then to the ECU. In this exemplary embodiment, the scanner 620 is a handheld device configured to read a two-dimensional bar code or other indicia having data for a particular component. For example, a bar code 622 may be disposed on a fuel injector 624. Alternatively, the scanner 620 may be a stationary scanner, a slot scanner, or another suitable bar code reader, and the bar code 622 may be disposed on a tag loosely coupled to the component. As discussed in detail below, the bar code 622 may have performance parameters, such as coefficients for the characteristic equation, as well as other information. Accordingly, the bar code 622 and accompanying scanner 620 may be used for readily and easily transferring performance characteristics for a particular component to the service computer 606 and ECU 604 for optimizing the engine 602.

Figure 12:
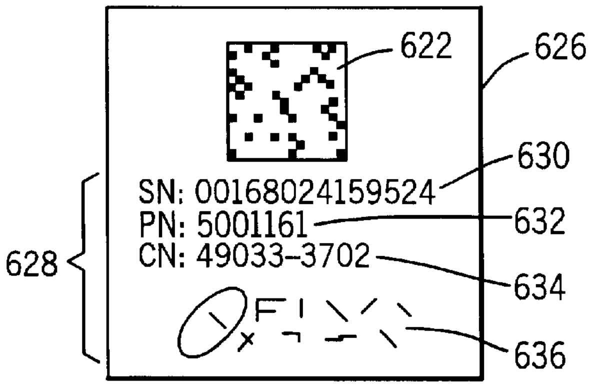
FIG. 12 is a top view of an adhesive label illustrating an exemplary embodiment of the two-dimensional bar code of the present technique.

FIG. 12 is an exemplary embodiment of the bar code 622 disposed on a label 626, which may also have human readable information 628 such as a serial number 630, a part number 632, a customer number 634 and a trademark, trade name, design series or other brand name 636. Although the exemplary bar code 622 illustrated in FIG. 12 is a 2-dimensional bar code, the present technique may utilize other forms of machine-readable encoded data. As illustrated in FIG. 11, the bar code 622 is physically disposed on component. However, the bar code 622 may be associated with the component in other ways, provided the bar code 622 is readily accessible in relation to the component. For example, the label 626 may be a printed label adhesively attached to the component, a tag loosely attached to the component or included in the packaging, or included for attachment to a surface near the location where the component is to be installed. Alternatively, the label 626 may be a solid colored pad on the component, having the bar code 622 physically cut or burned through the pad to use the contrasting color of the component surface to define the bar code 622. For example, a white epoxy paint may be used to paint the solid colored pad onto the component, and then a laser may be used to scribe or burn the bar code through the pad.

The bar code 622 and scanner 620 advantageously provide immediate access to information for a particular component, such as the fuel injector 624, without accessing or transferring data from a central database. Accordingly, the present technique substantially eliminates problems and disadvantages associated with information databases, such as unnecessary time for data tracking and retrieval, corrupt or incomplete data files in storage and/or inaccurate data transfers. The present technique ensures rapid and accurate data retrieval for a component, thereby speeding up the assembly and/or optimization of the component within a system. For example, it is particularly advantageous for inserting and optimizing a fuel injector in a combustion engine.

The performance parameters, or coefficients for the characteristic equation, are advantageously encoded in the bar code 622 for electronic retrieval by the scanner 624. Within the bar code 622, these values may be stored as comma delimited numbers, or may be delimited in other ways. These performance parameters, which may include coefficients for a third order polynomial, are component specific values based on individual testing of the fuel injectors. Accordingly, each fuel injector is tested on a test flow bench by applying a signal pulse having a selected minimum width and then measuring the fuel flow rate. The pulse width is then increased a known amount and the resulting fuel flow rate again is measured. The process is repeated a number of times, such as 8 to 10 times, to obtain a series of data points which relate pulse width to a fuel flow rate.

Following flow testing of each fuel injector, a characteristic equation is fit to these data points, defining a performance curve representative of the fuel flow output of the fuel injector for any pulse width. For example, a third-order polynomial such as ax3+bx2+cx+d=0 may be fit to the data points. The pulse width can then be correlated to the desired RPM. The degree of fit (R2), of the data points to the performance curve (defined by the third-order polynomial), is also determined within selected limits, such that those fuel injectors which fall outside of the selected degree of fit are discarded. The coefficients of at least a portion of those fuel injectors, which fall within the selected degree of fit, are used to determine a nominal performance curve. To provide an acceptable range about the nominal performance curve, upper and lower limits are set for the nominal curve at each of the pulse-width values used to test the multiplicity of fuel injectors. Each fuel injector is compared with the: nominal curve to determine if the performance curve of that particular fuel injector is within or outside the upper and lower limits of the nominal curve. Fuel injectors that are within the upper and lower limits are then used for assembly and replacement parts.

It will be appreciated by those skilled in the art that the coefficients (e.g., the third-order polynomial coefficients) for each curve representing a fuel injector may be determined by various techniques including manual calculations. A regressive analyzer may also be particularly useful. Such a regressive analyzer can provide the degree of fit according to a least squares method wherein R2=1 is considered a perfect fit. A degree of fit for R2>0.998 has been found to provide a suitable threshold for attaining or discarding fuel injectors as discussed above.

When an engine is initially manufactured, the coefficient data may be determined empirically by any such method. Coefficient data for each of the particular fuel injectors to be installed in the engine is written into read/write memory for use by the ECU microprocessor. To subsequently replace a failed fuel injector, it is then necessary to replace the third-order polynomial coefficient data to the read/write memory over the coefficient data of the failed fuel injector, so that during future operations of the engine, the new coefficient data will be available for use by the ECU microprocessor.

The foregoing technique is equally applicable to other components for the combustion engine 20, as well as in other systems having components capable of being tested to determine performance parameters. Once the flow testing is complete and the performance parameters have been determined, the information may be electronically stored by serial number or other suitable reference numbers for the individual component. A temporary label or bar code may be affixed or associated with the component prior to final data encoding with the label 626 and/or bar code 622. Eventually, the permanent bar code 622 is printed, scribed or associated with the component, as discussed above. The component (e.g., fuel injector 62) is then passed to a receiving facility, such as a manufacturer, where the component may be assembled into a system (e.g., combustion engine 20). Alternatively, the component may be passed to a parts distributor or to a customer having a system utilizing the component.

As explained above, the performance parameters for the component (e.g., fuel injector 62) may be scanned from the bar code 622 associated with that component. At the receiving facility, the manufacturer or assembler preferably has a scanner 620 coupled to a computer 606 for electronically retrieving the performance parameters during assembly. In the exemplary embodiment illustrated in FIG. 11, the computer 606 is coupled to the ECU 604 via the cable 608, allowing the performance parameters to be loaded into the ECU 604 for optimizing the control of the fuel injector 624. The fuel injector 624 is installed into the desired cylinder of the engine 602, and the coefficients for the characteristic equation (e.g., a third-order polynomial), which most closely defines the performance curve for the particular fuel injector 624, are stored in a read/write memory associated with that desired cylinder. To allow interpretation of these coefficients by the ECU 604, the basic form of the characteristic equation is also stored in memory for access and use by the ECU 604. The present technique may use RAM, ROM, EPROM, or other suitable memory formats depending on the application. In operation, the ECU 604 retrieves the coefficients for each fuel injector and uses those coefficients to solve the basic characteristic equation (e.g., third order polynomial). Accordingly, the ECU 604 determines the appropriate pulse width for a given throttle position or desired RPM, thereby causing the correct amount of fuel to be injected into the cylinder to achieve the desired RPM.

Similarly, as discussed above, other components may have bar codes 622 having performance parameters encoded therein, and the scanner may be used to either retrieve information to assist in assembly and configuration or to retrieve and transfer performance parameters to a control assembly for optimal control during operation of the overall system. The present technique may also be used at a service facility, where the combustion engine 20 is returned for repair or other servicing. Similarly, a customer having a setup as illustrated in FIG. 11 may also advantageously benefit from the present technique.

In addition, the present technique is advantageous where the component (e.g., fuel injector 624) is assembled into a system (e.g., engine 602) by an entity lacking the scanner 620, as illustrated in FIG. 11. For example, the fuel injector 624 may be purchased by a company or consumer for integration into a new engine, or even for replacement of a faulty fuel injector in an existing engine. In this situation, the component may pass through a service personnel, such as a distributor, a foreign facility or a foreign distributor, prior to reaching the entity purchasing the component. To benefit the purchasing entity, the service personnel could scan the bar code for the particular component (e.g., fuel injector 624), and then electronically transfer the performance parameters to a computer disk or some other electronic media such that the entity could access the information during assembly. The purchasing entity could then electronically transfer the performance parameters from the storage medium 616 to the computer 606, as illustrated in FIG. 11. This is particularly advantageous for foreign facilities and distributors, where transferring data from a domestic facility is timely, costly and ineffective because of incomplete and corrupt file transfers. Accordingly, in situations where the purchasing entity lacks the scanner 622, or where the component is simply used as a replacement, the performance parameters may be scanned by a service personnel and then electronically transferred to a computer disk.

To better assist the purchasing entity, the service personnel may create an executable program for simple installation of the scanned performance parameters. For example, the executable program and performance parameters may be stored on a floppy disk, which the purchaser could simply insert into the computer 606 and type "GO." Alternatively, the program could be self-executing. This "GO Disk" could be used for initial installation and configuration of a component, or for subsequent servicing. For initial installation of the fuel injector 624, the "GO Disk" could simply prompt the user to indicate the cylinder number, and upon entry would transfer the performance parameters to the control assembly or ECU 604.

Figure 13A:
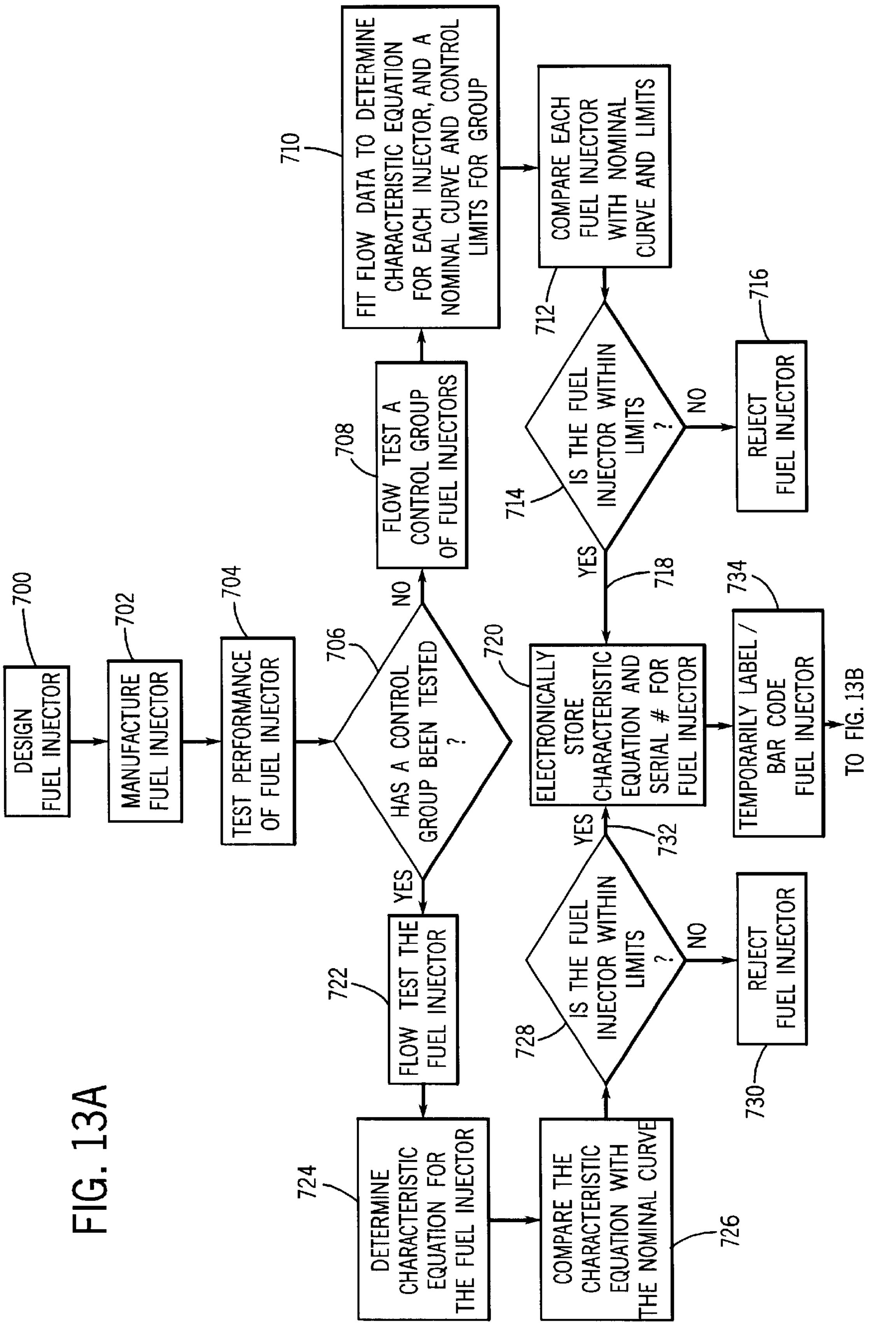
FIGS. 13*a* & 13*b* are a flow chart illustrating an implementation of one aspect of the present technique.
Figure 13B:
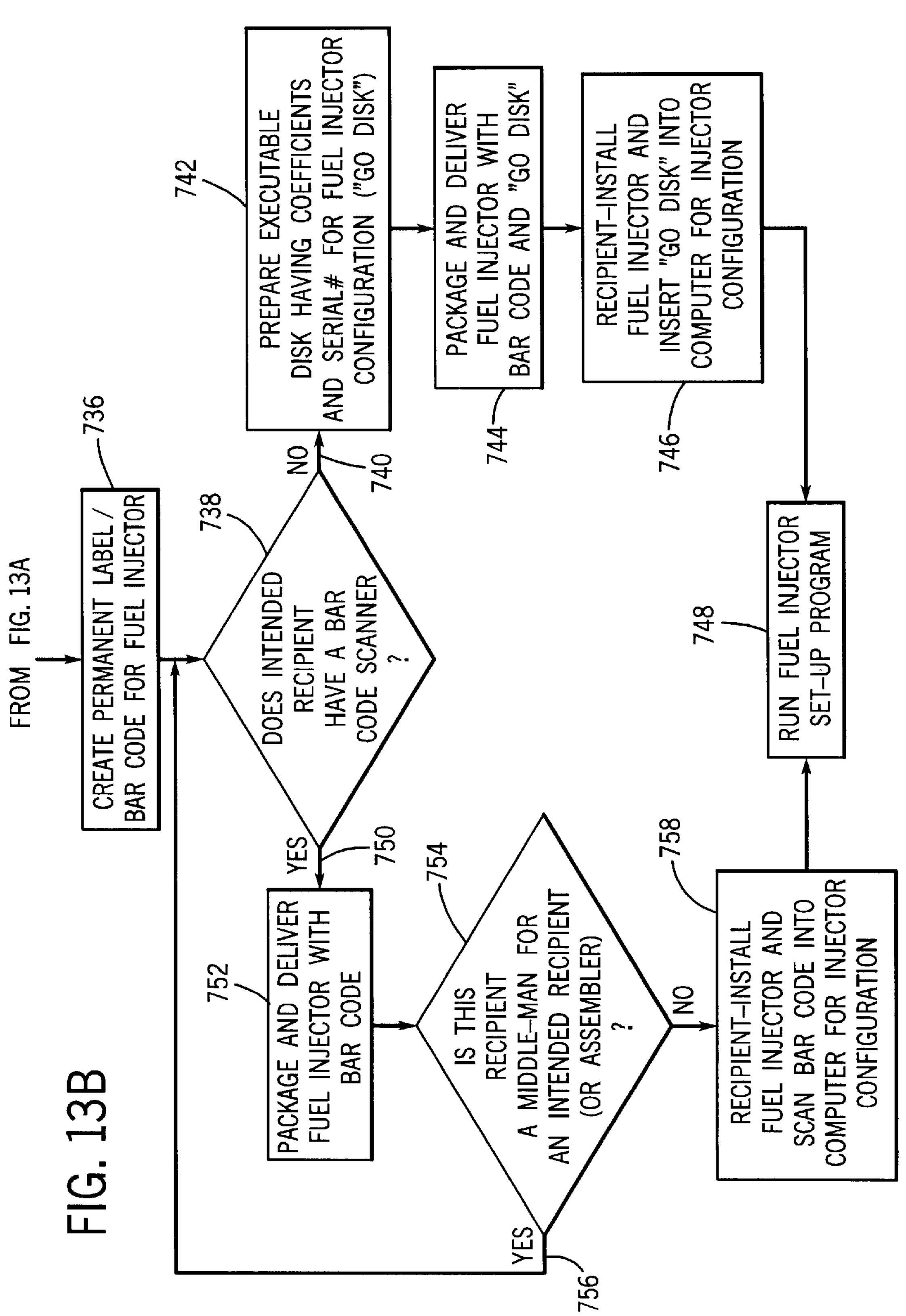

To service the engine 602, the present technique may comprise a particular system for replacing fuel injector data in the ECU 604 during fuel injector 618 replacement. The system includes the service computer 606 connectable to transmit data to the ECU 604. The service computer 606 advantageously has the drive 614 to electronically access the storage medium 616, which has the performance parameters for the replacement fuel injector 624, as previously described. A computer program is also supplied and will be described further with reference to FIGS. 13*a* & 13*b*. In general, the computer program includes a set of instructions which, when executed by the service computer 606, causes the service computer.606 to download an identification characteristic from the ECU 604, determine which fuel injector is to be replaced, read existing fuel injector coefficient data from the ECU for the fuel injector to be replaced, and save the existing fuel injector coefficient data. The replacement fuel injector coefficient data from the computer readable storage medium 616 is then written to the ECU 604 for the specific replacement fuel injector to be installed in engine 602.

Figure 14:
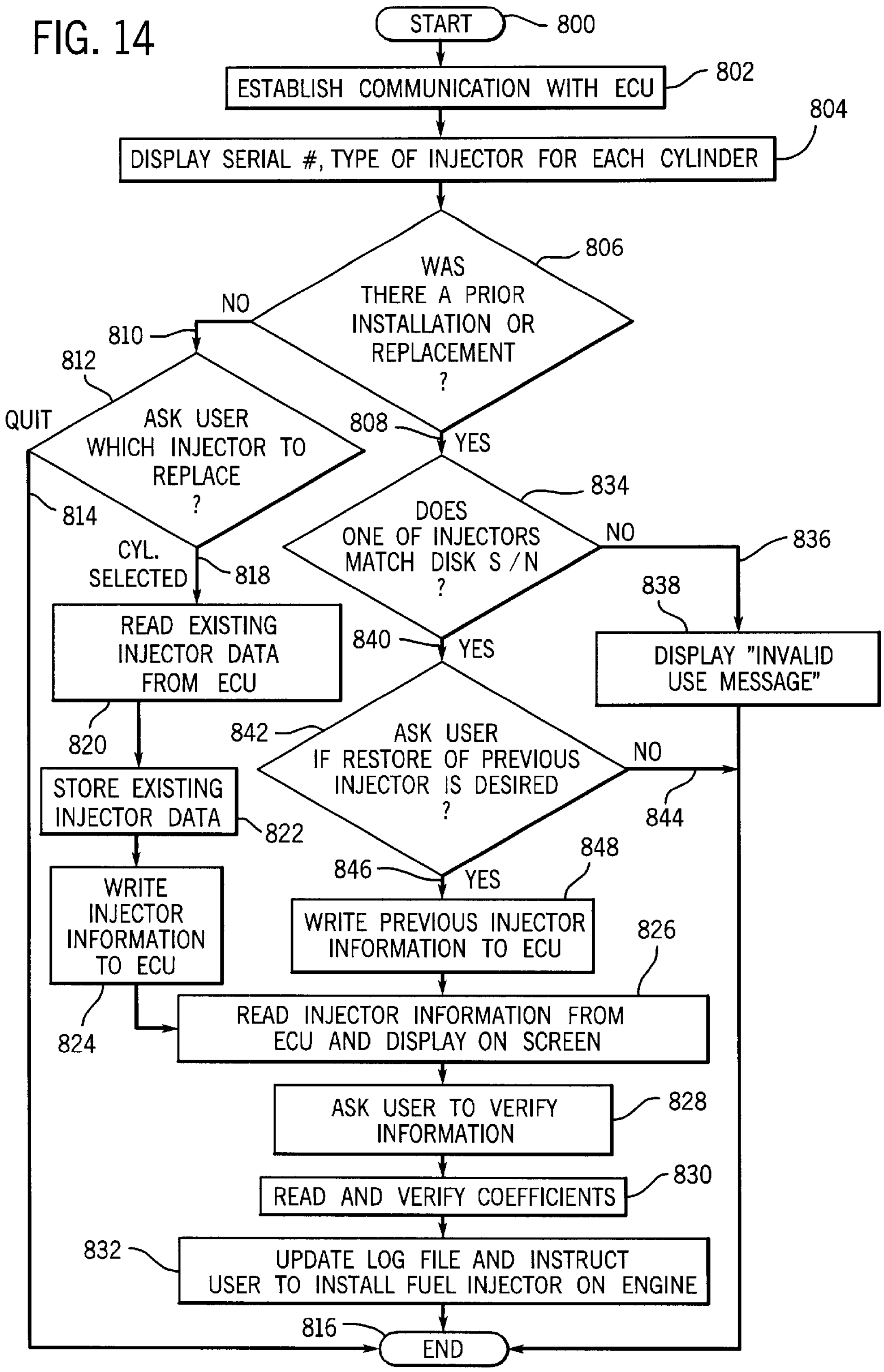
FIG. 14 is a flow chart showing an implementation of another aspect of the present technique.

FIGS. 13–14 are flow charts illustrating the present technique, including an exemplary fuel injector configuration program (FIG. 14), in operation. The present technique advantageously configures a combustion engine for a particular fuel injector, and, therefore, may comprise the entire fuel injector design process 700 and manufacturing process 702. Once a particular fuel injector has been designed and manufactured, the present technique advantageously tests the performance of the fuel injector 704. The performance testing can go in one of two directions 706, depending on whether the fuel injector is one of a series of fuel injectors that have previously undergone control group testing.

If a control group has not been tested, then the testing proceeds by testing the current fuel injector and others as a control group 708 for future fuel injectors of that particular model. Each of the fuel injectors in the control group are individually flow tested 708, and data is collected on the injector's performance. Using this data, a characteristic equation is determined for each fuel injector, and a nominal performance curve and upper and lower control limits are determined for the control group 710. The performance curve and control limits are then stored for subsequent testing and quality control of fuel injectors. Each fuel injector is then individually compared 712 with the nominal curve and control limits, and it is determined whether the fuel injector is within the limits 714. The fuel injector is rejected 716 if it is outside the control limits, otherwise it is accepted 718. The characteristic equation (e.g., coefficients) for each accepted fuel injector is then electronically stored by serial number 720.

If a control group has been tested, then the testing proceeds by flow testing the current fuel injector 722. The flow testing produces data, which is then used to determine a characteristic equation for the fuel injector 724. Each fuel injector is then individually compared 726 with the nominal curve and control limits, determined in the control group flow testing 710, and it is determined whether the fuel injector is within the limits 728. This is done to ensure relatively uniform performance of fuel injectors. The fuel injector is rejected 730 if it is outside the control limits, otherwise it is accepted 732. The characteristic equation (e.g., coefficients) for the accepted fuel injector is then electronically stored by serial number 720.

The present technique then advantageously converts these performance parameters, or characteristic equations, into scannable bar codes or other indicia to be associated with each fuel injector. After storing the characteristic equation 720, a temporary label/bar code may be affixed to the fuel injector 734. Alternatively, this temporary label may be affixed to the fuel injector prior to flow testing. A permanent bar code is eventually created for the fuel injector 736, as described above with reference to FIG. 12. The bar code may be directly affixed, burned or scribed into the fuel injector, or it may be loosely coupled to, or associated with, the fuel injector. Once the fuel injector has been bar coded 736, the fuel injector may be prepared and packaged for delivery to a recipient. The contents of this package may depend on whether or not the intended recipient has a bar code scanner 738.

If the intended recipient does not have a bar code scanner 740, then an executable disk (e.g., the "Go Disk") may be prepared to allow the recipient to properly set up the fuel injector in the engine 742. The "Go Disk" has the performance parameters and serial number of the fuel injector, and has an executable program to guide the recipient through the installation process. An exemplary program, which may be included on the "Go Disk" is described in detail below. Once the "Go Disk" has been prepared, the fuel injector is packaged and delivered 744 along with the bar code and "Go Disk." When the recipient is ready to install the fuel injector, the recipient may then insert the "Go Disk" into the computer for configuration of the fuel injector 746. The program is then executed 748 by typing "GO," as described in detail below.

If the intended recipient does have a bar code scanner 750, then an executable "Go Disk" is not necessary; Although the "Go Disk" remains an option, the bar coded fuel injector may be packaged and delivered without the "Go Disk" unless requested by the recipient 752. Depending upon the type of recipient 754 (e.g., assembler or distributor), a recipient who is simply a service personnel for another recipient (or customer) may need to repackage and/or deliver the fuel injector to another recipient. If the current recipient is simply a service personnel for a final user or assembler 756, then current recipient should determine whether or not the intended recipient has a bar code scanner 738. Referring back to the preceding two paragraphs, the current recipient may need to prepare a "Go Disk" if the intended recipient does not have a bar code scanner 742. If the current recipient is an assembler or manufacturer, then the recipient may simply install the fuel injector and scan the bar code in order to configure the control assembly 758. As explained above, the scanned bar code information may be electronically transferred to the computer 606, and then loaded into the ECU 604 (or control assembly 74) of the combustion engine 602. A fuel injector configuration program, such as the executable program on the "Go Disk," may also be available on the computer 606 or on the storage medium 616. Accordingly, the user could run the fuel injector setup program 748, as described in detail below.

Upon initialization 800, communication between the ECU and the service computer is established at 802. The service computer then downloads the serial number to identify the engine and ECU, and downloads a fuel injector identification for each cylinder in the engine at 804. The service computer then displays the serial number and type of injector for each cylinder 804 and then checks 806 to see if there was a last use of the disk. The computer then determines if the disk was previously used for installation or replacement of the performance parameters for the fuel injector, or if this is the first use of the disk 810.

The first time the computer program and the coefficient data are used 810, the user is first asked to select a piston cylinder for installation or replacement of the performance parameters configured for the fuel injector desired in that cylinder 812. If for some reason, the user does not wish to proceed, the user may exit the program 814, 816 by pressing the Esc key on the service computer 606. This branch may also be followed if a time out feature is added in case the user does not respond to the inquiry at 812. Further, this exit path is also desirable in the event a user wants to just confirm that the service computer is properly communicating with a given ECU, even if installation/replacement of an injector in that particular engine is not desired. Once the user selects an injector to be replaced 812, 818, the service computer reads the existing fuel injector coefficient data from the ECU at 820 and saves it 822 to the computer readable storage medium. The installation/ replacement fuel injector coefficient data is then read from the storage medium and written to the ECU 824, and then read back from the ECU at 826 to verify accuracy of the written replacement fuel injector coefficient data. The cylinder for which data was written, together with the fuel injector serial number can also be displayed on the service computer at 826. The user is then asked to verify the accuracy of the information displayed 828. The service computer then checks the read back coefficient data with the replacement fuel coefficient data from the computer readable storage medium, and verifies that the coefficients were written accurately 830. The service computer then updates a log file 832 to record the previous path and instruction set that was just executed. In the aforementioned example, the log file records whether the last action taken was for a first installation or replacement, or whether it was for restoring performance parameters for a previously removed fuel injector. Once the log file is updated, the user is instructed to physically install the replacement fuel injector 832 in the particular cylinder selected at 818, after which the program exists at 816.

Once the program has been initially used, and it is desired to restore the original coefficient data because, for example, the new injector did not solve whatever service problem was being experienced. In such a case, the service, personnel may wish to reinstall the old injector. Upon initialization 800 and after the service computer establishes communication with the ECU 802, the system acquires and displays the serial number and type of injectors for each cylinder 804. After the initial determination that the program was previously used for installation/replacement, the program then proceeds with the restoration path 808. That is, the last use of the disk was for replacement of the original coefficient data. The program then restricts the use of the original fuel injector coefficients by checking to see if one of the injectors in the engine matches the serial number on the computer readable storage medium 834. If it does not 836, an invalid use message is displayed 838 and the program exists at 816 indicating that the fuel injector that came with this disk and the replacement coefficient data is not installed in this particular engine. However, if one of the serial numbers of the injectors in the engine matches the serial number on the disk 840, the user is asked if the original fuel injector coefficient data is to be restored in the ECU at 842. If the user does not wish to restore the original coefficient data 844 the program then ends at 816.

However, assuming that the user wishes to restore the original fuel injector coefficient data 846, the original coefficient data is written to the ECU at 848 and then read back at 826. The injector serial number and cylinder number are then displayed on the service computer at 826. The user is then asked to verify the information displayed at 828 and the service computer verifies the accuracy of the coefficient data that is written in the ECU with that on the computer readable storage medium at 830. The log file is then updated at 832 to indicate that the original fuel injector coefficient data has been reinstalled in the engine, indicating that the new/ replacement fuel injector coefficient data, together with the corresponding fuel injector, may be reused in another engine. The user is then instructed to install the original injector back into the respective cylinder of the engine at 832, and the program is then complete at 816.

It should now be apparent that the computer program, together with the data file and the new injector may be used in another cylinder or another engine. The present invention contemplates the use of a fuel injector of a type commonly referred to as single fluid pressure surge direct delivery fuel injector used in gasoline engines, and more specifically, in 2-stroke gasoline engines. One application of such an injector is a 2-stroke gasoline outboard marine engine, as shown in FIG. 11. These fuel injectors typically do not entrain the gasoline in a gaseous mixture before injection. However, it will be appreciated by those skilled in the art that the above-described invention is equally suited for use with other types of injectors. Another type of direct fuel delivery uses a high pressure pump for pressurizing a high pressure line to deliver fuel to the fuel injector through a fuel rail that delivers fuel to each injector. A pressure control valve may be coupled at one end of the fuel rail to regulate the level of pressure of the fuel supplied to the injectors to maintain a substantially constant pressure. The pressure may be maintained by dumping excess fuel back to the vapor separator through a suitable return line. The fuel rail may incorporate nipples that allow the fuel injectors to receive fuel from the fuel rail. Thus, in this case, a substantially steady pressure differential, as opposed to a pressure surge, between the fuel rail and the nipples cause the fuel to be injected into the fuel chamber. Another example of direct fuel injection is a direct dual-fluid injection system that includes a compressor or other compressing means configured to provide a source of gas under pressure to effect injection of the fuel to the engine. That is, fuel injectors that deliver a metered individual quantity of fuel entrained in a gaseous mixture. It is to be understood, however, that the present invention is not limited to any particular type of direct fuel injector.

Accordingly, the present technique includes a method of servicing an engine requiring fuel injector replacement. The method may involve identifying a fuel injector in need of replacement by cylinder number, and establishing communication between a service computer and an ECU of the engine. The method also may involve downloading an identification of the ECU, the engine, and the fuel injector(s) from the ECU to the service computer. Furthermore, the servicing method may involve writing replacement fuel injector coefficient data into the ECU for a given replacement fuel injector for the cylinder number identified, and installing the replacement fuel injector in the cylinder number identified.

This method also may advantageously involve downloading and storing the existing fuel injector coefficient data, prior to writing over the memory locations containing the coefficient data, and then restricting use of the prior data to restoration in the engine from which it was originally downloaded. The method may further involve displaying an injector serial number and injector-type for each cylinder, determining if the replacement fuel injector coefficient data has been uploaded previously, and if so, determining whether an injector serial number in the engine matches a serial number of the replacement fuel injector. If there is a match, the restoration is allowed to proceed by uploading the existing fuel injector coefficient data back into the ECU. In order to verify that the data was properly loaded into the ECU, the method may also involve reading the written replacement fuel injector coefficient data back from the ECU, and displaying the desired installation cylinder number and coefficient data for the fuel injector. The replacement fuel injector coefficient data stored in the ECU is then verified by comparison with the data stored on the computer readable storage medium.

In this exemplary servicing technique, the method also involves supplying a production fuel injector having its flow performance defined by a characteristic equation (e.g., a third-order polynomial), the coefficients of which may be determined by flow rate testing the fuel injector. The method also advantageously involves bar coding performance parameters (e.g., the coefficients for the characteristic equation) of the fuel injector onto a tag or label to be attached to or packaged with the fuel injector. By scanning the bar code, a user is permitted to quickly access performance characteristics for the particular fuel injector during installation, and to configure the combustion engine to optimize the flow performance of the injector. If the user lacks a bar code scanner, then the method may also advantageously provide an injector configuration disk.

If the intended recipient is unknown, or known to lack a bar code scanner, then the method may further involve electronically storing the performance parameters (e.g., the coefficients) and providing a program for loading the performance parameters into the control assembly for the combustion engine. For example, the performance parameters may be stored on a floppy disk, a CD ROM disk, a ZIP disk, a DVD RAM disk, or other electronically transferable storage medium. The method also may involve creating a computer program for a particular application (e.g., fuel injector installation or replacement), and storing the program on the foregoing storage media along with the performance parameters. The program may be configured for automatic injector installation, or it may guide the user through the installation process step by step.

The present technique may also provide a fuel injector service pack having a single replacement fuel injector and a computer readable storage medium. The fuel injector has a fuel flow rate that is characterized by a custom set of coefficients that are experimentally determined for that particular fuel injector and fit a characteristic equation (e.g., a third-order polynomial) that defines a performance curve of the fuel injector. The replacement fuel injector also has the foregoing coefficients, along with other relevant information, bar coded onto the fuel injector, or loosely attached to or included with the fuel injector. The computer readable storage medium may have a data file and a computer program stored thereon. The data file may contain a serial number of the replacement fuel injector and the custom set of coefficients for the replacement fuel injector. The computer program stored on the computer readable storage medium advantageously has executable instructions to cause the computer to: (1) allow identification of a cylinder in a fuel injected engine for which a fuel injector is to be replaced, (2) read and store existing fuel injector coefficient data from an ECU of the fuel injected engine, and (3) write the custom set of coefficients from the data file to the ECU for use with the single replacement fuel injector.

The computer readable storage medium also may advantageously include a log file for which the computer program maintains a history of actions taken by the computer program to ensure, as good as possible, that the matched set of custom coefficients and the single replacement fuel injector are kept together. The computer program of the service pack also allows the computer to restore the existing fuel injector coefficient data if the single replacement fuel injector did not solve a user's service problem. The program is also configured to restrict use of the existing fueled injector coefficient data and the original fuel injector. Accordingly, the program writes the serial number of the replacement fuel injector to the ECU when the custom set of coefficients are written to the ECU, and then later, if the previous use of the computer program was to replace data, the program reads and compares each fuel injector serial number in the ECU with the serial number of the replacement fuel injector as stored in the data file. If a match exists, the software allows the existing fuel injector coefficient data to be written back into the ECU, and directs that the original fuel injector be reinstalled in the cylinder identified to match with the existing fuel injector coefficient data. Otherwise, the program restricts the restoration operation.

The present technique also includes a method for providing replacement fuel injectors for an engine, the method involving supplying a production fuel injector with relaxed tolerances as compared to a standard service injector, acquiring a set of coefficients that characterize a performance curve for that particular production fuel injector, and bar coding the coefficients and other relevant injector characteristics onto the fuel injector or onto a tag or label loosely attached to or associated with the fuel injector. The bar code is advantageously configured such that a buyer/user can easily scan the bar code to access the coefficients during installation of the fuel injector. The method also may involve writing the set of coefficients to a transportable computer readable medium. The method also may involve providing a computer program on a transportable computer readable medium that, when executed, causes a computer to load the set of coefficients into an ECU of an engine in which the production fuel injector is to be installed.

In accordance with this aspect of the invention, each of the production fuel injectors is fuel flow tested in order to determine a set of coefficients to be supplied with that particular production fuel injector. Preferably, the method also includes the steps of reading and storing existing fuel injector coefficient data from the ECU before writing over the data, and allowing restoration of that existing fuel injector coefficient data if the replacement procedure did not result in a satisfactory outcome. The program also may restrict use of the existing fuel injector coefficient data and the original fuel injector by writing a serial number of the production fuel injector to the ECU, and upon a request to restore data, reading and comparing each fuel injector serial number in the ECU with the serial number of the production fuel injector. If a match exists, the existing fuel injector coefficient data is allowed to be written back into the ECU, otherwise the execution is halted. The method also involves directing the user to install the original fuel injector into the appropriate cylinder, if such action was deemed allowable, as previously described.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A system for assembling a device having a combustion engine, the system comprising:

a data set comprising performance characteristics for an injector unit; and machine readable indicia associated with the injector unit, wherein the data set is encoded in the indicia and is retrievable by a scanner, allowing access to the data set such that the injector unit may be readily assembled with the device according to the performance characteristics wherein the performance characteristics comprise coefficients for an equation characterizing results from testing and wherein the equation comprises a polynomial of at least a third order.

2. The system of claim 1, wherein the data set comprises an identification number for the injector unit.

3. The system of claim 1, wherein the equation characterizes substantially optimal performance of the injector unit based on a set of test data comprising a series of signal inputs and flow responses of the injector unit at a series of operating conditions.

4. The system of claim 3, wherein each of the series of signal inputs have a pulse time, and wherein the set of test data comprises a substantially optimal pulse time at each of the series of operating conditions, and the equation provides a best fit of the set of test data.

5. The system of claim 1, comprising the injector unit.

6. The system of claim 1, wherein the injector unit is configured to supply a fuel for combustion in the combustion engine.

7. The system of claim 1, wherein the injector unit comprises a reciprocally driven pump assembly.

8. The system of claim 1, wherein the indicia comprise a multidimensional bar code affixed to the injector unit.

9. The system of claim 1, wherein the indicia are configured for coupling with the injector unit.

10. The system of claim 1, wherein the indicia comprise a laser scribed area.

11. The system of claim 1, wherein the indicia a disposed on a tag.

12. The system of claim 1, wherein the indicia are configured to be loosely packaged with the injector unit.

13. The system of claim 1, comprising a scanner assembly configured for decoding the indicia to retrieve the data set.

14. The system of claim 13, further comprising a data transfer assembly coupled to the scanner assembly.

15. The system of claim 14, wherein the data transfer assembly comprises a processor assembly.

16. The system of claim 14, wherein the data transfer assembly comprises a memory assembly.

17. The system of claim 14, wherein the data transfer assembly comprises a display assembly.

18. The system of claim 14, wherein the data transfer assembly comprises a processor assembly, a memory device, and a configuration program stored on the memory device, wherein the configuration program is adapted to use the data set to provide an instruction set for configuring the device according to the performance characteristics of the injector unit.

19. The system of claim 14, wherein the data transfer assembly comprises a data transfer path connectable with a data communication port of the device.

20. The system of claim 19, wherein the device comprises a control system having, a processor and memory, and the data communication port is coupled to the control system.

21. The system of claim 20, wherein the control system has a signal path configured for coupling with the injector unit in an assembled device, which has the injector unit assembled wit the device.

22. The system of claim 20, wherein the control system is configured to utilize at least a portion of the data set to provide a control signal through the signal path to the injector unit for activating the injector unit.

23. The system of claim 22, wherein the control system is configured to provide the control signal for a pulse time, and the performance characteristics are adapted to provide an optimal pulse time for the injector unit.

24. The system of claim 1, further comprising a memory assembly configured for storing the data set.

25. The system of claim 24, wherein the memory assembly comprises a computer disk.

26. The system of claim 1, further comprising a program stored on a memory device, wherein the memory device is accessible by a data processor assembly, and the program is adapted to use the data set to provide an instruction set for configuring the device according to the performance characteristics of the injector unit.

27. A system for installing a component, the system comprising:

a component for a motor assembly;

a set of component characteristics comprising parameters derived from tests on the performance of the component; and a bar code for distribution with the component, wherein the set of component characteristics am encoded in the bar code and the parameters comprise coefficients for an equation characterizing data from the tests, the data comprising a set of responses to inputs and wherein the equation comprises a polynomial of at least the third order.

28. The system of claim 27, wherein the component has relaxed manufacturing tolerances.

29. The system of claim 27, wherein the component comprises an electronic portion configured to receive a control signal.

30. The system of claim 29, wherein the component comprises an injector.

31. The system of claim 27, wherein the motor assembly comprises a combustion chamber configured to burn a fuel.

32. The system of claim 27, wherein the motor assembly comprises a control assembly configured to provide a control signal.

33. The system of claim 32, wherein the control assembly comprises memory configured to store the set of component characteristics, and comprises a processor coupled to the memory for accessing the set of component characteristics to determine the control signal.

34. The system of claim 27, wherein the bar code comprises a multidimensional bar code.

35. The system of claim 27, wherein the bar code is coupled to the component.

36. The system of claim 27, further comprising a data transfer system configured for electronically accessing the set of component characteristics.

37. The system of claim 36, wherein the data transfer system comprises a scanner configured to decode the bar code for accessing the set of component characteristics.

38. The system of claim 36, wherein the data transfer system comprises a memory device configured to electronically store the set of component characteristics.

39. The system of claim 36, wherein the data transfer system comprises a computer assembly having a processor and memory.

40. The system of claim 27, further comprising a program having an instruction set for electronically transferring the parameters to a memory of the motor assembly, wherein the program is stored in a memory unit accessible by a device having a processor.

41. A method of enhancing an assembly process, the method comprising:

obtaining data on the performance of the component;

determining a set of parameters characterizing the component based on the data; and encoding the set of parameters into a machine readable indicia for distribution with the component wherein the act of determining a set of parameters comprises fitting the data to an equation and wherein the act of fitting the data to an equation comprises fitting the data to a polynomnial of at least a third order.

42. The method of claim 41, further comprising the act of testing the component mechanical responses to an electrical control signal delivered to the component.

43. The method of claim 42, wherein the act of testing the component comprises flow testing a fuel injector.

44. The method of claim 43, wherein the act of flow testing the fuel injector comprises varying a pulse time for dispersing a fuel from the fuel injector, and measuring performance at a set of operating conditions.

45. The method of claim 44, wherein the act of flow testing comprises waiting the pulse time and measuring performance at a series of the operating conditions, wherein the operating conditions comprise an RPM and a throttle position.

46. The method of claim 41, wherein the act of obtaining data comprises electrically storing the data.

47. The method of claim 41, wherein the act of encoding the set of parameters into machine readable indicia comprises encoding the set of parameters into a multidimensional bar code affixed to the component.

48. The method of claim 47, further comprising the act of distributing the component with the bar code affixed thereto.

49. The method of claim 41, further comprising creating a component having relaxed manufacturing tolerances.

50. The method of claim 41, wherein the act of obtaining data comprises testing a component having relaxed manufacturing tolerances.

51. A method for installing a component into a system having a motor, the method comprising:

scanning machine readable indicia associated with the component;

decoding a set of parameters encoded in the indicia, the set of parameters comprising performance parameters characterizing the component; and configuring the system according to the set of parameters wherein the act of decoding the set of parameters comprises retrieving coefficients for an equation characterizing the performance of the component and wherein the act of retrieving coefficients for an equation comprises retrieving coefficients for a polynomial of at least a third degree.

52. The method of claim 51, wherein the set of scanning the indicia comprises scanning a multidimensional bar code.

53. The method of claim 52, wherein the act of scanning a bar code associated with the component comprises scanning a bar code associated with a fuel injector.

54. The method of claim 51, wherein the act of configuring the system comprises storing the performance parameters in memory for a control assembly of the system 55. The method of claim 51, further comprising installing the component into the system.

56. A fuel injection assembly comprising:

a fuel injector unit having an injector portion and an actuator coupled to the injector portion for actuating the injector portion, the fuel injector having performance characteristics; and machine readable indicia encoding the performance characteristics wherein the performance characteristics comprise coefficients for a polynomial of at least the third order.

57. The fuel injection assembly of claim 56, wherein the machine readable indicia comprise a multi-dimensional bar code.

58. The fuel injection assembly of claim 56, wherein the machine readable indicia are disposed on the body.

59. The fuel injection assembly of claim 56, wherein the machine readable indicia are disposed on an indicia support configured for distribution with the fuel injector unit.

60. The fuel injection assembly of claim 56, comprising a memory device having the performance parameters stored thereon wherein the memory device is associated with the fuel injection assembly.

61. The fuel injection assembly of claim 60, wherein the memory device is a computer disk configured for distribution with the fuel injector unit.

62. The fuel injection assembly of claim 60, wherein the memory device comprises a program having an instruction set configured to utilize the performance parameters to configure a machine system for the fuel injector unit.

* * * * *

UNITED STATES PATENT AND TRADEMARK OFFICE

CERTIFICATE OF CORRECTION

PATENT NO. : 6,671,611 B1
DATED : December 30, 2003
INVENTOR(S) : Peltier, Daniel E.

It is certified that error appears in the above-identified patent and that said Letters Patent is hereby corrected as shown below:

Column 3,
Line 42, delete “diagrammatically” and substitute therefor -- diagrammatical --;

Column 7,
Line 3, delete “in cylinder” and substitute therefor -- in-cylinder --;

Column 8,
Line 57, delete “towardsalignment” and substitute therefor -- towards alignment --;

Column 9,
Line 14, delete “recessedcavity” and substitute therefor -- recessed cavity --;
Line 57, delete “guidetube” and substitute therefor -- guide tube --;

Column 12,
Line 62, delete “the;ignition” and substitute therefor -- the ignition --;

Column 15,
Line 56, delete “the:” and substitute therefor -- the --;

Column 17,
Line 56, delete “computer.606” and substitute therefor -- computer 606 --;

Column 19,
Line 6, delete “necessary;” and substitute therefor -- necessary. --;
Line 58, delete “installation/ replacement” and substitute therefor -- installation/replacement --;

Column 20,
Line 15, delete “service,” and substitute therefor -- service --;

UNITED STATES PATENT AND TRADEMARK OFFICE
CERTIFICATE OF CORRECTION

PATENT NO. : 6,671,611 B1
DATED : December 30, 2003
INVENTOR(S) : Peltier, Daniel E.

It is certified that error appears in the above-identified patent and that said Letters Patent is hereby corrected as shown below:

Column 24,
Line 62, delete "am" and substitute therefor -- are --;

Column 25,
Line 58, delete "waiting" and subsitute therefor -- varying --.

Signed and Sealed this

Sixteenth Day of March, 2004

JON W. DUDAS
*Acting Director of the United States Patent and Trademark Office*